United States Patent
Horiuchi et al.

(10) Patent No.: US 11,633,906 B2
(45) Date of Patent: Apr. 25, 2023

(54) EXPANSION APPARATUS, SHAPING SYSTEM, AND MANUFACTURING METHOD OF SHAPED OBJECT

(71) Applicant: CASIO COMPUTER CO., LTD., Tokyo (JP)

(72) Inventors: Yuji Horiuchi, Higashiyamato (JP); Kenji Iwamoto, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 84 days.

(21) Appl. No.: 16/689,138

(22) Filed: Nov. 20, 2019

(65) Prior Publication Data

US 2020/0180212 A1    Jun. 11, 2020

(30) Foreign Application Priority Data

Dec. 6, 2018  (JP) .............................. JP2018-228745

(51) Int. Cl.
   *B29C 61/04*    (2006.01)
   *B29C 61/06*    (2006.01)
   *B29K 701/12*   (2006.01)

(52) U.S. Cl.
   CPC .......... *B29C 61/04* (2013.01); *B29C 61/0616* (2013.01); *B29C 2795/002* (2013.01); *B29K 2701/12* (2013.01)

(58) Field of Classification Search
   CPC .................................. B23B 3/26; B29C 44/02
   See application file for complete search history.

(56) References Cited

U.S. PATENT DOCUMENTS

| | | | | |
|---|---|---|---|---|
| 5,909,232 A | * | 6/1999 | Goto ................... | G06K 15/129 |
| | | | | 347/187 |
| 2012/0048450 A1 | * | 3/2012 | Fu ........................ | B32B 29/005 |
| | | | | 156/83 |
| 2014/0110887 A1 | * | 4/2014 | Horiuchi .................... | B41J 3/28 |
| | | | | 264/413 |

FOREIGN PATENT DOCUMENTS

| | | | | |
|---|---|---|---|---|
| JP | S64-28660 A | 1/1989 | | |
| JP | 2001-088423 A | 4/2001 | | |
| JP | 2001-130194 A | 5/2001 | | |
| JP | 2001-150789 A | 6/2001 | | |
| JP | 2001150789 A | * 6/2001 | ............. | B41M 3/06 |
| JP | 2010-185005 A | 8/2010 | | |
| JP | 5212504 B2 | 6/2013 | | |

OTHER PUBLICATIONS

Extended European Search Report dated May 8, 2020 received in European Patent Application No. EP 19207954.9.

* cited by examiner

*Primary Examiner* — Matthew J Daniels
*Assistant Examiner* — Gregory C. Grosso
(74) *Attorney, Agent, or Firm* — Scully Scott Murphy & Presser

(57) ABSTRACT

An expansion apparatus includes: a first expander for irradiating with electromagnetic waves emitted from a lamp a thermal conversion layer for conversion of the electromagnetic waves to heat, to cause at least a portion of a thermal expansion layer to expand, the thermal conversion layer being laminated to a molding sheet including a base and the thermal expansion layer laminated to a first main surface of the base; and a second expander for causing expansion of a region (C) of the thermal expansion layer that is smaller in size than a region (B) of the thermal expansion layer expanded by the first expander.

12 Claims, 15 Drawing Sheets

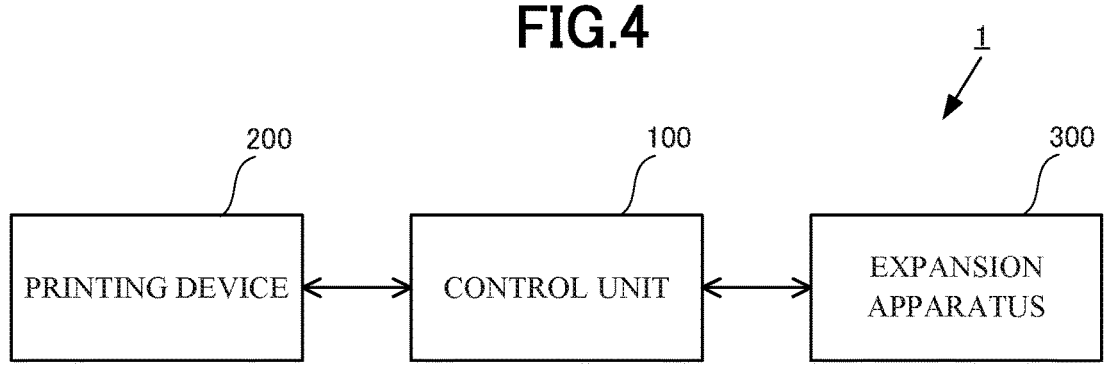
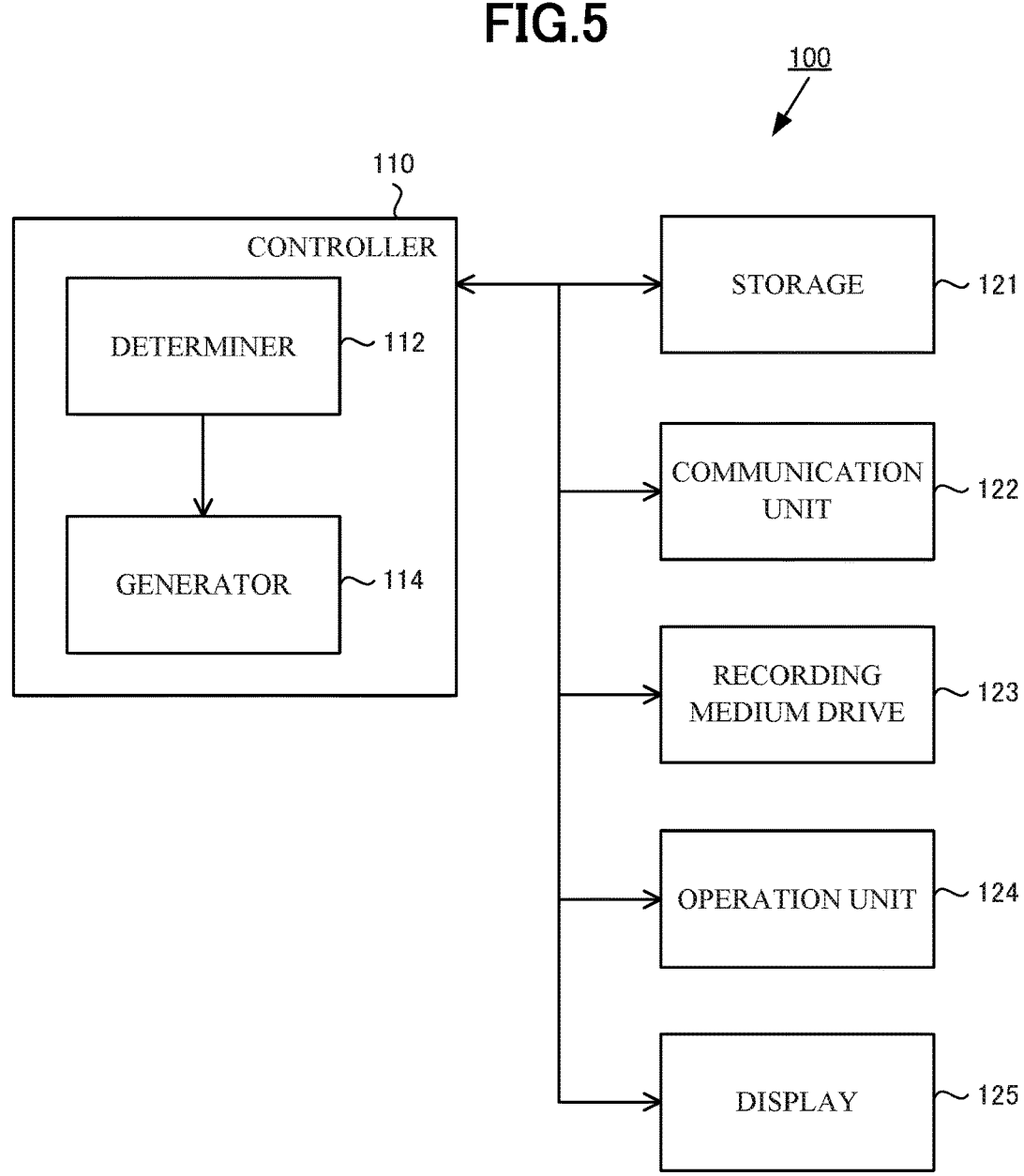

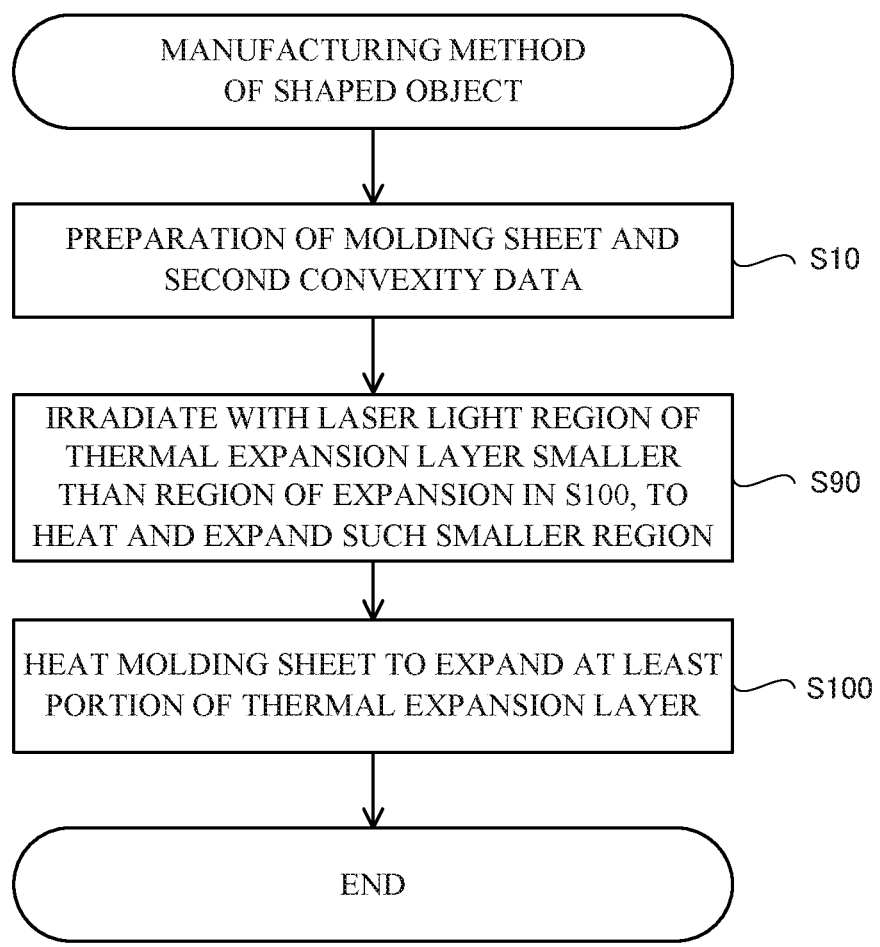

EXPANSION APPARATUS, SHAPING SYSTEM, AND MANUFACTURING METHOD OF SHAPED OBJECT

CROSS-REFERENCE TO RELATED APPLICATION

This application claims the benefit of Japanese Patent Application No. 2018-228745, filed on Dec. 6, 2018, the entire disclosure of which is incorporated by reference herein.

FIELD

The present disclosure relates to an expansion apparatus, a shaping system, and a manufacturing method of a shaped object.

BACKGROUND

Technology is known that forms a three-dimensional image (a shaped object) by causing expansion of thermally expandable microspheres by selecting heating an image portion by irradiating with light a thermal expansion sheet that has a base sheet and a coating layer including the thermally expandable microspheres, a prescribed image being formed of an image-molding material having excellent light absorption characteristics on the thermally expansive sheet (for example, see Unexamined Japanese Patent Application Kokai Publication No. S64-28660).

In Unexamined Japanese Patent Application Kokai Publication No. S64-28660, due to heating of the thermally expandable microspheres by heat generated from the image-molding material forming the image, in addition to the thermally expandable microspheres of the coating layer corresponding to the image, the thermally expandable microspheres are also heated in the vicinity of the thermally expandable microspheres of the coating layer corresponding to the image. Due to expansion also in the vicinity of the image portion of the thermally expandable sheet in this manner, manufacture of a shaped object having fine unevennesses is difficult.

In consideration of the aforementioned circumstances, an objective of the present disclosure is to provide an expansion apparatus, a shaping system, and a manufacturing method of a shaped object that are capable of manufacturing a shaped object having finer unevennesses.

SUMMARY

In order to achieve the aforementioned objective, an expansion apparatus according to a first aspect of the present disclosure includes:
a first expander configured to cause expansion of at least a portion of a thermal expansion layer by irradiating with electromagnetic waves emitted from a lamp a thermal conversion layer for conversion of the electromagnetic waves to heat, the thermal conversion layer being laminated onto a molding sheet that includes a base and the thermal expansion layer laminated onto a first main surface of the base; and
a second expander configured to cause expansion of a region of the thermal expansion layer by irradiating the region with laser light, the region being smaller than a size of a region in which the first expander causes expansion of the thermal expansion layer.

In order to achieve the aforementioned objective, an expansion apparatus according to a second aspect of the present disclosure includes:
a first expander configured to cause expansion of at least a portion of a thermal expansion layer by heating a molding sheet that includes a base and the thermal expansion layer laminated onto a first main surface of the base; and
a second expander configured to cause expansion of a region of the thermal expansion layer by irradiating the region with laser light, the region being smaller than a size of a region in which the first expander causes expansion of the thermal expansion layer.

In order to achieve the aforementioned objective, a shaping system according to a third aspect of the present disclosure is a shaping system for manufacture of a shaped object having unevenness from a molding sheet including a base and a thermal expansion layer laminated onto a first main surface of the base. The shaping system includes:
a determiner configured to determine, based on unevenness data representing the unevenness, that a convexity having a width and a length that are each greater than or equal to a respective threshold is a first convexity, and that a convexity having at least one of a width or a length that is smaller than the respective threshold is a second convexity;
a generation unit configured to generate, based on (i) positions of the first convexity and the second convexity determined by the determiner and (ii) the unevenness data, a first convexity data representing the first convexity and a second convexity data representing the second convexity;
a printing device configured to print, based on the first convexity data generated by the generation unit, onto the molding sheet a thermal conversion layer for conversion of electromagnetic waves into heat; and
an expansion apparatus comprising
   a first expander configured to cause expansion of at least a portion of the thermal expansion layer by irradiating the thermal conversion layer with the electromagnetic waves emitted from a lamp; and
   a second expander configured to, based on the second convexity data generated by the generation unit, cause expansion of a region by irradiating with laser light the region that is smaller in size than a region of the first convexity of the molding sheet.

In order to achieve the aforementioned objective, a manufacturing method of manufacturing a shaped object according to a fourth aspect of the present disclosure is a method for manufacture of a shaped object having unevennesses by expansion of a molding sheet. The method includes:
a first expansion step of causing heating and expansion of at least a portion of a thermal expansion layer of the molding sheet by heat released from the thermal conversion layer by irradiating with electromagnetic waves emitted from a lamp the thermal conversion layer for conversion of the electromagnetic waves to heat, the thermal conversion layer being laminated onto the molding sheet; and
a second expansion step of causing heating and expansion of a region of the thermal expansion layer by irradiating with laser light a region of the thermal expansion layer smaller in size than a region of the thermal expansion layer expanded in the first expansion step.

BRIEF DESCRIPTION OF THE DRAWINGS

A more complete understanding of this application can be obtained when the following detailed description is considered in conjunction with the following drawings, in which:

FIG. 4 illustrates configuration of a shaping system according to Embodiment 1 of the present disclosure;

FIG. 5 is a block diagram illustrating configuration of a control unit according to Embodiment 1 of the present disclosure;

FIG. 22 is a flowchart illustrating a manufacturing method of a shaped object according to Embodiment 4 of the present disclosure.

DETAILED DESCRIPTION

Figure 1:
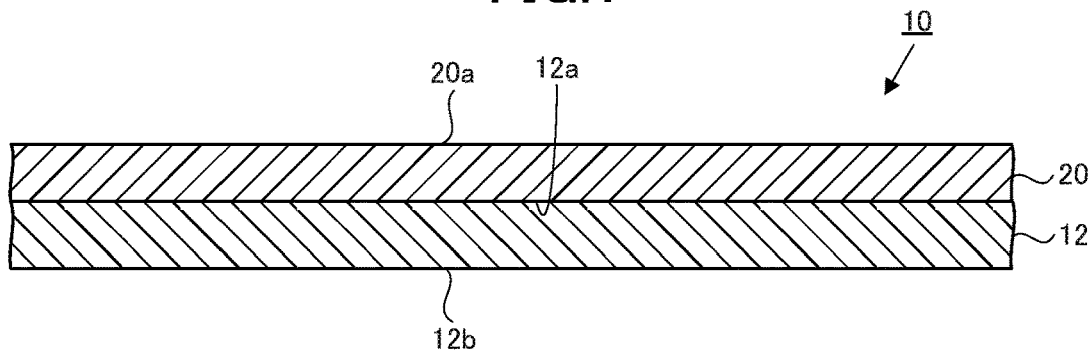
FIG. 1 is a schematic view illustrating a cross section of a molding sheet according to Embodiment 1 of the present disclosure.

An apparatus and a shaping system equipped with the expansion apparatus according an embodiment of the present disclosure is described below with reference to drawings.

Embodiment 1

In the present embodiment, a shaping system 1 manufactures a shaped object 50 from a molding sheet 10 that thermally expands. The shaped object 50 is used as a decorative sheet, wallpaper, or the like. In the present disclosure, the term "shaped object" refers to a sheet that includes unevennesses shaped (formed) on a predetermined surface, and the unevennesses form geometrical shapes, characters, patterns, decorations, or the like. The term "decorations" refers to objects that appeal to the aesthetic sense through visual and/or tactile sensation. The term "shaped (or molded)" refers to the forming of a shaped object, and is to be construed to also include concepts such as decoration and ornamentation by forming decorations. Moreover, although the shaped object 50 of the present embodiment is a three-dimensional object that includes unevennesses on a predetermined surface, to distinguish this three-dimensional object from three-dimensional objects formed using a so-called 3D printer, the shaped object 50 of the present embodiment is called a 2.5-dimensional (2.5D) object or a pseudo-three-dimensional (pseudo-3D) object. The technique used to produce the shaped object of the present embodiment is called 2.5D printing or pseudo-3D printing.

Molding Sheet and Shaped Object

The molding sheet 10 and the shaped object 50 are firstly described with reference to FIGS. 1 to 3. As illustrated in FIG. 1, the molding sheet 10 is provided with a base 12 and a thermal expansion layer 20 laminated onto a first main surface 12a of the base 12. In the present embodiment, the thermal expansion layer 20 is laminated onto the entire surface of the first main surface 12a.

The base 12 of the molding sheet 10 has a first main surface 12a to which the thermal expansion layer 20 is laminated and a second main surface 12b on the side opposite to the first main surface 12a. The base 12 supports the thermal expansion layer 20. The base 12 is formed, for example, in a sheet-like shape. Examples of the material of the base 12 include thermoplastic resins such as polyolefin resins (polyethylene (PE), polypropylene (PP), or the like) and polyester resins (polyethylene terephthalate (PET), polybutylene terephthalate (PBT), or the like). The type of material of the base 12 and the thickness of the base 12 are selected according to the intended application of the shaped object 50.

The thermal expansion layer 20 of the molding sheet 10 is laminated onto the first main surface 12a of the base 12. The thermal expansion layer 20 includes a binder and a non-illustrated thermal expansion material dispersed in the binder. Any thermoplastic resin, such as a vinyl acetate-type polymer or an acrylic-type polymer, may be used as the binder. The thermal expansion material expands as a result of being heated to a predetermined temperature or higher, and expands to a size in accordance with the heat amount of the heating, that is, specifically a heating temperature, a heating time, or the like. The thermal expansion material expands as a result of being heated to 80° C. to 120° C. or higher, for example. The thermal expansion material is thermally expandable microcapsules, for example.

The thermally expandable microcapsules are microcapsules that encapsulate a foaming agent including propane, butane, or another low boiling point substance in shells made from a thermoplastic resin. The shells of the thermally expandable microcapsules are formed from a thermoplastic resin such as, for example, polystyrene, polyvinyl chloride, polyvinylidene chloride, polyvinyl acetate, polyacrylic acid ester, polyacrylonitrile, polybutadiene, and copolymers thereof. When the thermally expandable microcapsules are heated to the predetermined temperature or higher, the shells soften, the foaming agent vaporizes, and the pressure resulting from the vaporization of the foaming agent causes the shells to expand in a balloon-like manner. The thermally expandable microcapsules expand to a size about five-times larger than that prior to expansion. The average particle size of the thermally expandable microcapsules prior to expansion is about 5 to 50 μm, for example.

The thermal expansion layer 20 of the molding sheet 10 distends due to the expansion of the thermal expansion material, and a below-described first unevenness 60 and a second unevenness 70 are formed on a surface 20a opposite to the base 12.

Figure 2:
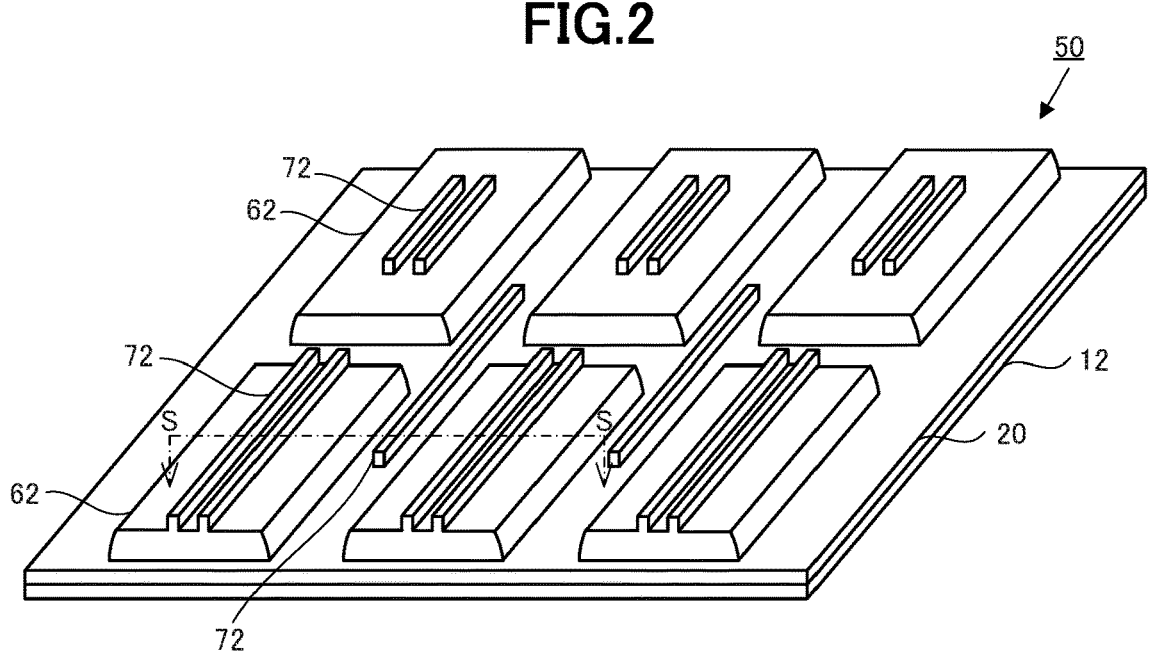
FIG. 2 is a perspective view illustrating a shaped object according to Embodiment 1 of the present disclosure.
Figure 3:
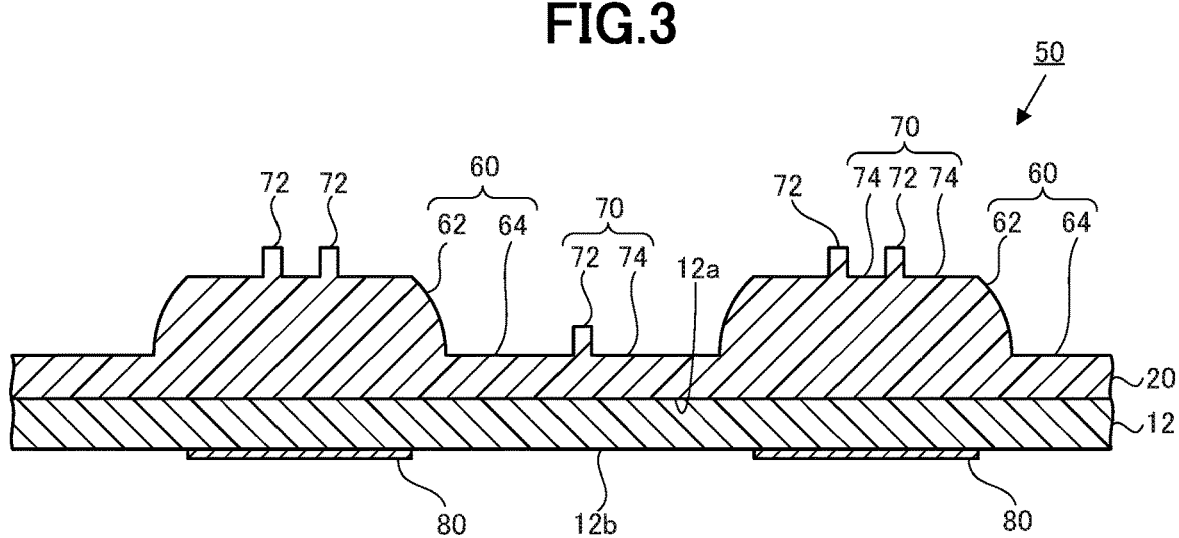
FIG. 3 is a cross-sectional view showing the shaped object illustrated in FIG. 2 taken along line S-S.

As illustrated in FIGS. 2 and 3, the shaped object 50 is provided with: the base 12; the thermal expansion layer 20 laminated onto the first main surface 12a of the base 12 and having the first unevenness 60 and the second unevenness 70 on the side opposite to the base 12; and a thermal conversion layer 80 laminated in a pattern corresponding to the first unevenness 60.

The shaped object 50 is a sheet-like shaped object and has the first unevenness 60 and the second unevenness 70 of a surface. The configuration of the base 12 of the shaped object 50 is similar to the base 12 of the molding sheet 10, and thus the thermal expansion layer 20 and the thermal conversion layer 80 of the shaped object 50 are described here.

The thermal expansion layer 20 of the shaped object 50 is a layer in which a portion of the thermal expansion layer 20 of the molding sheet 10 is expanded. The thermal expansion layer 20 of the shaped object 50 includes a binder similarly to the binder of the thermal expansion layer 20 of the molding sheet 10, a thermal expansion material (thermal expansion material prior to thermal expansion) similarly to the thermal expansion material of the thermal expansion layer 20 of the molding sheet 10, and a thermal expansion material that is the expanded thermal expansion material of the thermal expansion layer 20 of the molding sheet 10.

The first unevenness 60 of the thermal expansion layer 20 is an unevenness due to a first convexity 62 formed by expansion of the thermal expansion material of the thermal expansion layer 20 of the molding sheet 10. The first unevenness 60 includes a first convexity 62 and a first concavity 64. Moreover, the second unevenness 70 of the thermal expansion layer 20 of the shaped object 50 is an unevenness due to a second convexity 72 formed by expansion of the thermal expansion material of the thermal expansion layer 20 of the molding sheet 10. The second unevenness 70 includes the second convexity 72 and a second concavity 74. Here, for the first convexity 62, width (length in the longitudinal direction of the shaped object 50) and length (length in the transverse direction of the shaped object 50) are each greater than or equal to a respective threshold, and for the second convexity, the width and length are each smaller than the respective threshold. That is to say, when the first unevenness 60 and the second unevenness 70 are compared with each other, the unevenness of the second unevenness 70 is finer than the unevenness of the first unevenness 60.

The thermal conversion layer 80 of the shaped object 50 is laminated, onto the second main surface 12b of the base 12, in a pattern corresponding to the first unevenness 60 of the thermal expansion layer 20. The thermal conversion layer 80 converts the irradiated electromagnetic waves into heat and releases the converted heat. The thermal expansion material is heated by the heat released from the thermal conversion layer 80. The heated thermal expansion material expands to a size in accordance with a heating temperature, a heating period, or the like. Due to such operation, the expanded thermal expansion material is formed, and the thermal expansion layer 20 expands. Due to conversion of the electromagnetic waves by at the thermal conversion layer 80 to heat more rapidly than at other portions of the molding sheet 10, a region, that is, the thermal expansion material, in the vicinity of the thermal conversion layer 80 can be heated.

The thermal conversion layer 80 is formed from a thermal conversion material that absorbs and converts the electromagnetic waves to heat. Examples of the thermal conversion material include carbon black, metal hexaboride compounds, and tungsten oxide compounds. Carbon black, for example, absorbs and converts visible light, infrared light, or the like to heat. Metal hexaboride compounds and tungsten oxide compounds absorb and convert near-infrared light to heat. Among the metal hexaboride compounds and the tungsten oxide compounds, lanthanum hexaboride ($LaB_6$) and cesium tungsten oxide may be used from the perspectives of obtaining high light absorptivity in the near-infrared region and high transmittance in the visible light spectrum.

Shaping System

The shaping system 1 for manufacturing of the shaped object 50 from the molding sheet 10 is described next. As illustrated in FIG. 4, the shaping system 1 is provided with: a control unit 100; a printing device 200 for printing the thermal conversion layer 80 onto the molding sheet 10; and an expansion apparatus 300 for causing expansion of at least a portion of the thermal expansion layer 20 of the molding sheet 10 to form the first convexity 62 and the second convexity 72, that is, to form the first unevenness 60 and the second unevenness 70.

The control unit 100 controls the printing device 200 and the expansion apparatus 300. As illustrated in FIG. 5, the control unit 100 is provided with a controller 110, a storage 121, a communication unit 122, a recording medium drive 123, an operation unit 124, and a display 125.

The controller 110 of the control unit 100 controls various components of the control unit 100. Moreover, the controller 110 controls operations of the printing device 200 and the expansion apparatus 300. Further, the controller 110, based on unevenness data associating position on the thermal expansion layer 20 and height for causing expansion that represents the unevenness shape of the shaped object 50, generates data for forming the first convexity 62 and the second convexity 72. Further, the controller 110 functions as control means.

The controller 110 has a determiner 112 for determining the first convexity 62 and the second convexity 72 based on the unevenness data, and a generator 114 for generation of first convexity data for forming the distinguished first convexity 62 and the second convexity data for forming the distinguished second convexity 72. The determiner 112 and the generator 114 function respectively as a determiner and a generation unit.

The determiner 112 of the controller 110, for example, determines the convexity portions of the unevenness shape represented by the unevenness data. Next, the determiner 112 determines that a convexity portion having a height, width, and length that are each greater than or equal to the respective prescribed threshold is the first convexity 62, and determines that a convexity portion having at least one of a width or a length that is less than the respective threshold value is the second convexity 72. Then the determiner 112 generates, and outputs to the generator 114 of the controller 110, the position data representing the positions of the determined first convexity 62 and second convexity 72.

The generator 114 of the controller 110, for example, based on the unevenness data and the position data output from the determiner 112, generates the first convexity data associating a height for causing expansion of the first convexity 62 and the position thereof on the thermal expansion layer 20, and the second convexity data associating a height for causing expansion of the second convexity 72 and the position thereof on the thermal expansion layer 20. The first convexity data is data representing the first convexity 62, and the second convexity data is data representing the second convexity 72. The controller 110 controls operations of the printing device 200 and the expansion apparatus 300 based on the generated first convexity data and second convexity data.

The storage 121 of the control unit 100 stores data and programs used for control of the printing device 200 and the expansion apparatus 300. The communication unit 122 of the control unit 100 communicates with the printing device 200 and the expansion apparatus 300.

The recording medium drive 123 of the control unit 100 reads programs or data recorded on a portable recording medium. The term "portable recording medium" means a compact disc (CD)-ROM, a digital versatile disc (DVD)-ROM, a flash memory having a universal serial bus (USB) specification connector, or the like.

The operation unit 124 of the control unit 100 receives an operation from the user. The user can inputs a command for the control unit 100 by operation of the operation unit 124.

The display 125 of the control unit 100 displays data, information representing status of the printing device 200 and the expansion apparatus 300, or the like.

Figure 6:
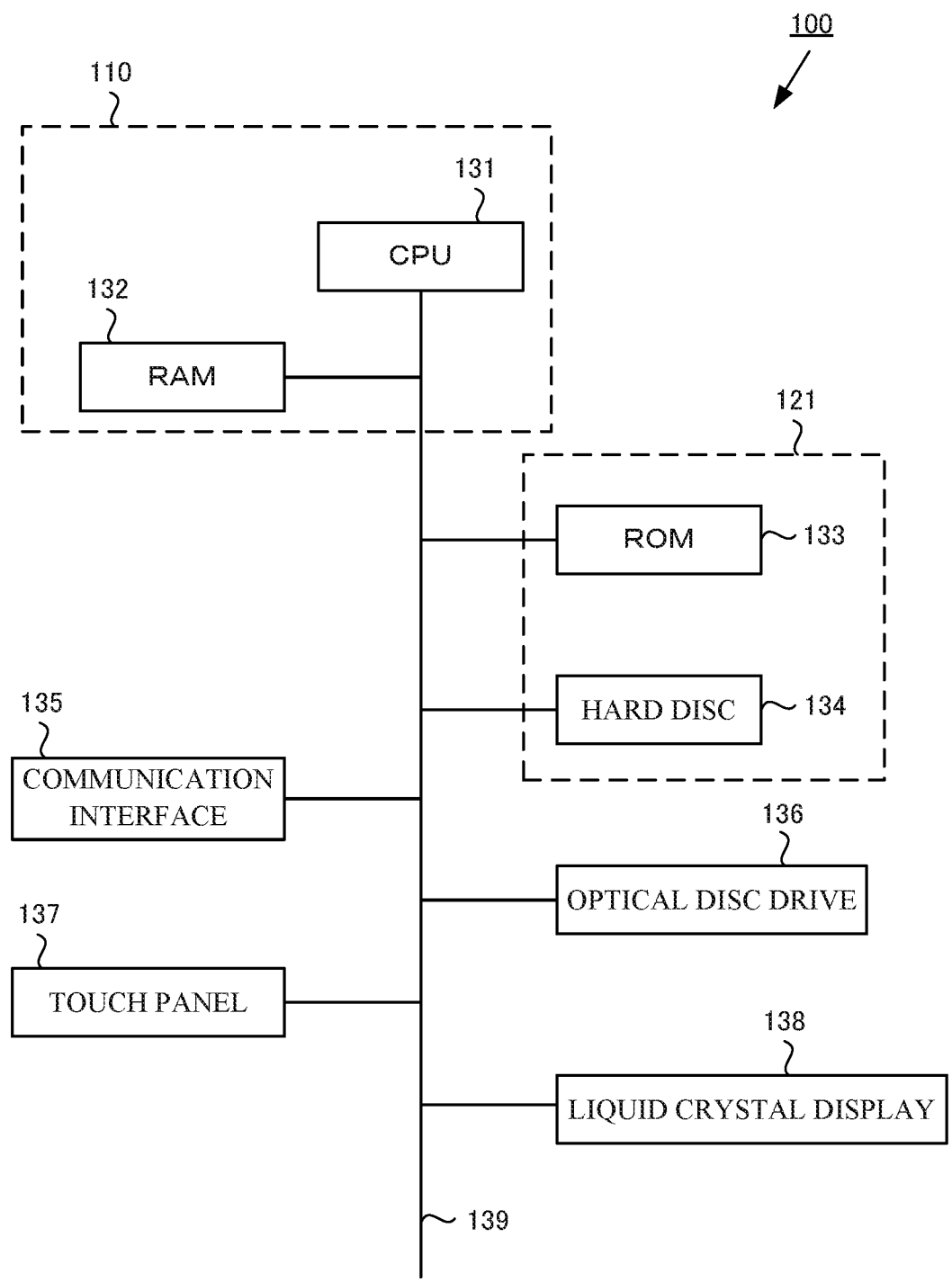
FIG. 6 illustrates configuration of hardware of the control unit according to Embodiment 1 of the present disclosure.

FIG. 6 illustrates configuration of hardware of the control unit 100. The controller 110 includes a central processing unit (CPU) 131 and a random access memory (RAM) 132. The functions of the controller 110 are achieved by the CPU 131 executing programs stored in the storage 121. The storage 121 includes a read only memory (ROM) 133 and a hard disc 134. The communication unit 122 is a communication interface 135. The recording medium drive 123 is an optical disc drive 136, for example. The operation unit 124 is a touch panel 137, a keyboard, or a mouse, for example. An example of display 125 is a liquid crystal display 138. The CPU 131 and various components are connected together via a bus 139.

Again with reference to FIG. 4, the printing device 200 is controlled by the control unit 100. The printing device 200 prints the thermal conversion layer 80 onto the second main surface 12*b* of the base 12 of the molding sheet 10. The printing device 200 is an ink jet printer, for example. The printing device 200 is provided with a controller including a CPU and a storage including ROM and RAM, although such components are not illustrated.

The printing device 200 prints the thermal conversion layer 80 in a pattern corresponding to the first unevenness 60, on the basis of the first convexity data, generated by the controller 110 of the control unit 100, associating position on the thermal expansion layer 20 with height for causing expansion of the first convexity 62. Specifically, the amount of heat released from the thermal conversion layer 80 depends on the concentration of the thermal conversion material (that is, lightness-darkness of the ink), a unit surface area of the electromagnetic waves irradiated on the thermal conversion layer 80, and the energy amount per unit time, and thus the printing device 200 prints a lightness-darkness pattern in accordance with the height and position of the first convexity 62 on the second main surface 12*b* of the base 12. Such operation causes lamination of the thermal conversion layer 80 to the second main surface 12*b* of the base 12.

Figure 7:
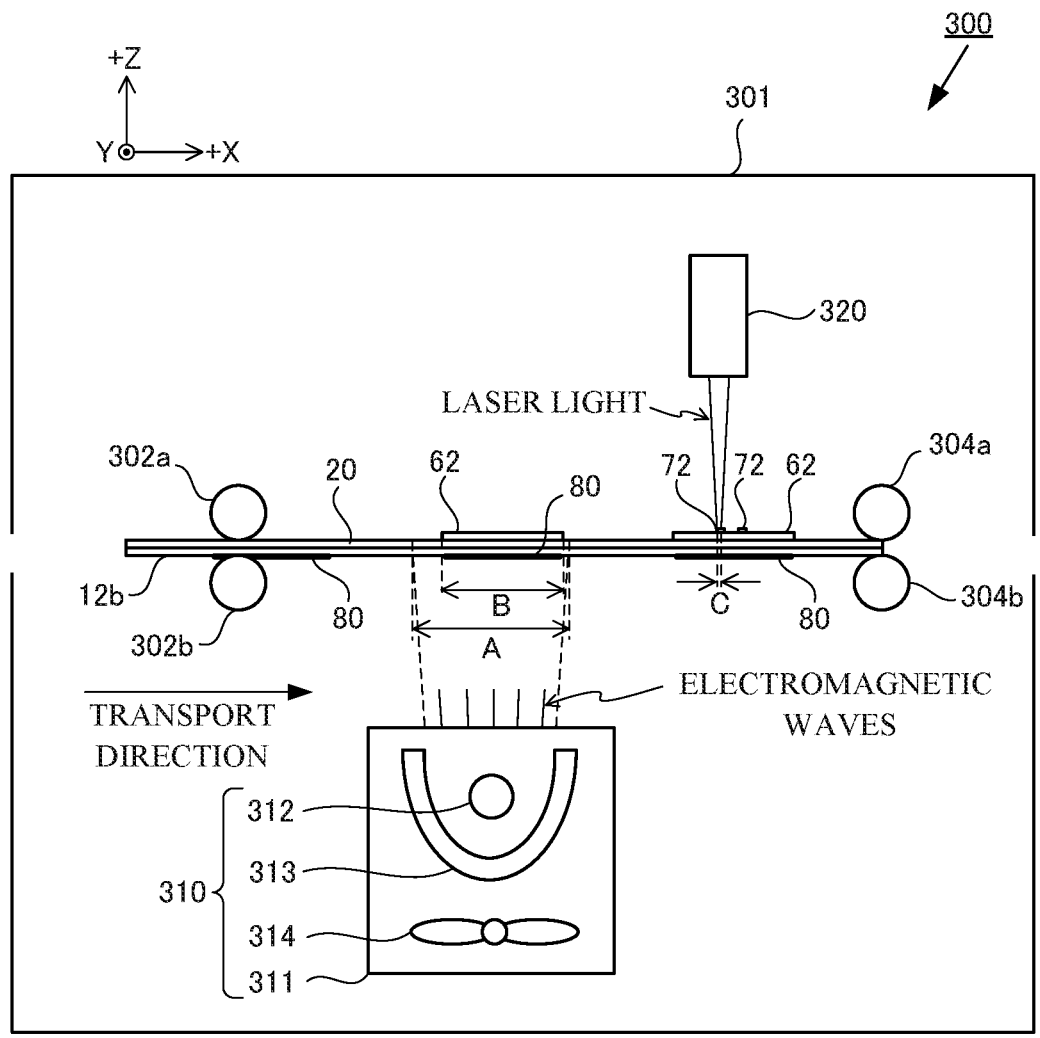
FIG. 7 is a schematic view illustrating an expansion apparatus according to Embodiment 1 of the present disclosure.

The expansion apparatus 300 is controlled by the control unit 100. The expansion apparatus 300 causes expansion of at least a portion of the thermal expansion layer 20 of the molding sheet 10, thereby forming the first convexity 62, that is, the first unevenness 60, and the second convexity 72, that is, the second unevenness 70. As illustrated in FIG. 7, the expansion apparatus 300, within a housing 301, is equipped with transport rollers 302*a*, 302*b*, 304*a*, and 304*b*, a first expander 310, and a second expander 320. Moreover, the expansion apparatus 300 is equipped with a controller including a CPU and a storage including ROM and RAM, although these components are not illustrated. For ease of understanding in the present detailed description, in FIG. 7, the length-wise rightward direction (rightward direction on the page) of the expansion apparatus 300 is described as the +X-axis direction, the upward direction (upward direction on the page) is described as the +Z-axis direction, and the direction perpendicular to the +X-axis direction and the +Z-axis direction is described as the +Y-axis direction (out the front of the page).

The transport roller 302*a* and the transport roller 302*b* form a pair of rollers, and the transport roller 304*a* and the transport roller 304*b* form a pair of rollers. The pair of transport rollers 302*a* and 302*b* nip and the pair of transport rollers 304*a* and 304*b* nip the molding sheet 10 to which the thermal conversion layer 80 is laminated. The transport rollers 302*a*, 302*b*, 304*a*, and 304*b* rotate and thus transport, from the −X side to the +X side, the molding sheet 10 to which the thermal conversion layer 80 is laminated. The transport rollers 302*a*, 302*b*, 304*a*, and 304*b* function as a transporter configured to transport the molding sheet 10 to which the thermal layer conversion layer 80 is laminated.

In the present embodiment, the molding sheet 10 to which the thermal conversion layer 80 is laminated is guided by a non-illustrated transport guide and is transported from the −X side to the +X side with the thermal expansion layer 20 facing the +Z-axis direction and the second main surface 12*b* of the base 12 facing the −Z-axis direction. While transporting the molding sheet 10 to which the thermal conversion layer 80 is laminated, the expansion apparatus 300 causes expansion of the thermal expansion layer 20 of the molding sheet 10 by the first expander 310 and the second expander 320.

The first expander 310 of the expansion apparatus 300 causes expansion of at least a portion of the thermal expansion layer 20 by irradiating with the electromagnetic waves the thermal conversion layer 80 laminated onto the molding sheet 10. Specifically, the first expander 310 irradiates with the electromagnetic waves the thermal conversion layer 80 laminated onto the molding sheet 10, thereby causing release of heat by the thermal conversion layer 80 within a region A irradiated with the electromagnetic waves. The first expander 310, by the heat released from the thermal conversion layer 80, causes heating and expansion of the thermal expansion material at a portion of the thermal expansion layer 20 corresponding to the thermal conversion layer 80. Due to such operation, the first expander 310 causes expansion of the portion of the thermal expansion layer 20 corresponding to the thermal conversion layer 80.

Due to formation of the thermal conversion layer 80 on the basis of the first convexity data that associates the height for causing expansion as the first convexity 62 with the position on the thermal expansion layer 20, the first convexity 62 is formed on the thermal expansion layer 20. In the present embodiment, the first expander 310 is disposed to the −Z side relative to transportation path of the molding sheet 10 to which the thermal conversion layer 80 is laminated, and irradiates with the electromagnetic waves from the −Z side, that is, from the second main surface 12b side of the base 12. Moreover, the first expander 310 is disposed more to the −X side than the second expander 320. In the present embodiment, the region A irradiated by the first expander 310 with the electromagnetic waves is wider than a region C irradiated with laser light by the second expander 320 as described below.

The first expander 310 is equipped with, for example, a cover 311, a lamp 312, a reflection plate 313, and a fan 314. The cover 311 contains the lamp 312, the reflection plate 313, and the fan 314. The lamp 312 includes a straight tube-type halogen lamp, for example. The lamp 312 irradiates the molding sheet 10 with the electromagnetic waves in the near infrared region (750 to 1,400 nm wavelength), the visible light region (380 to 750 nm), the middle infrared region (1,400 to 4,000 nm), or the like. The reflection plate 313 reflects toward the molding sheet 10 the electromagnetic waves irradiated from the lamp 312. The fan 314 blows air into the cover 311 and cools the lamp 312 and the reflection plate 313.

The second expander 320 of the expansion apparatus 300 heats and causes expansion of the region C by irradiating with the laser light the region C that is smaller in size that the region, that is, the region B of the first convexity 62 in the present embodiment, made to expand by the first expander 310 on the thermal expansion layer 20. Specifically, based on the second convexity data generated by the control unit 100, the second expander 320 causes heating and expansion of the thermal expansion material by irradiation with the laser light of an intensity corresponding to the height of the second convexity 72 at the position of formation of the second convexity 72 on the thermal expansion layer 20. Due to such operation, the thermal expansion layer 20 expands, and the second convexity 72 is formed on the thermal expansion layer 20. In the present embodiment, the second expander 320 is disposed further to the +Z side relative to the transport path of the molding sheet 10 to which the thermal conversion layer 80 is laminated, and irradiates with the laser light from the +Z side, that is, from the thermal expansion layer 20 side. Moreover, the second expander 320 is disposed further to the +X side than the first expander 310.

The second expander 320 is a carbon dioxide gas laser irradiator, for example. The second expander 320 includes non-illustrated components such as a carbon dioxide gas laser oscillation unit, a polygonal mirror, a lens, or the like. By the polygonal mirror reflecting the carbon dioxide gas laser light emitted by the carbon dioxide gas laser oscillation unit, and by scanning of the carbon dioxide gas laser light in the +Y and −Y directions, the second expander 320 irradiates with the carbon dioxide gas laser light the position of formation of the second convexity 72 on the thermal expansion layer 20.

In the present embodiment, the second expander 320 irradiates with the laser light the small region C of the thermal expansion layer 20 of the molding sheet 10, and thus locally heats the small region C. Thus the expansion apparatus 300 can manufacture the shaped object 50 that has the finer second unevenness 70, that is, that has the finer second convexity 72. Further, in the present disclosure, the expression "heat by irradiation with the laser light" indicates heating with the laser light without conversion of the energy of the laser light to thermal energy, that is, without heating via the thermal conversion layer 80.

Manufacturing Method of Shaped Object

The manufacturing method of the shaped object 50 is described next with reference to FIGS. 8 to 10. In the present embodiment, the shaped object 50 is manufactured from the molding sheet 10 that is sheet-like, such as an A4 paper-sized sheet.

Figure 8:
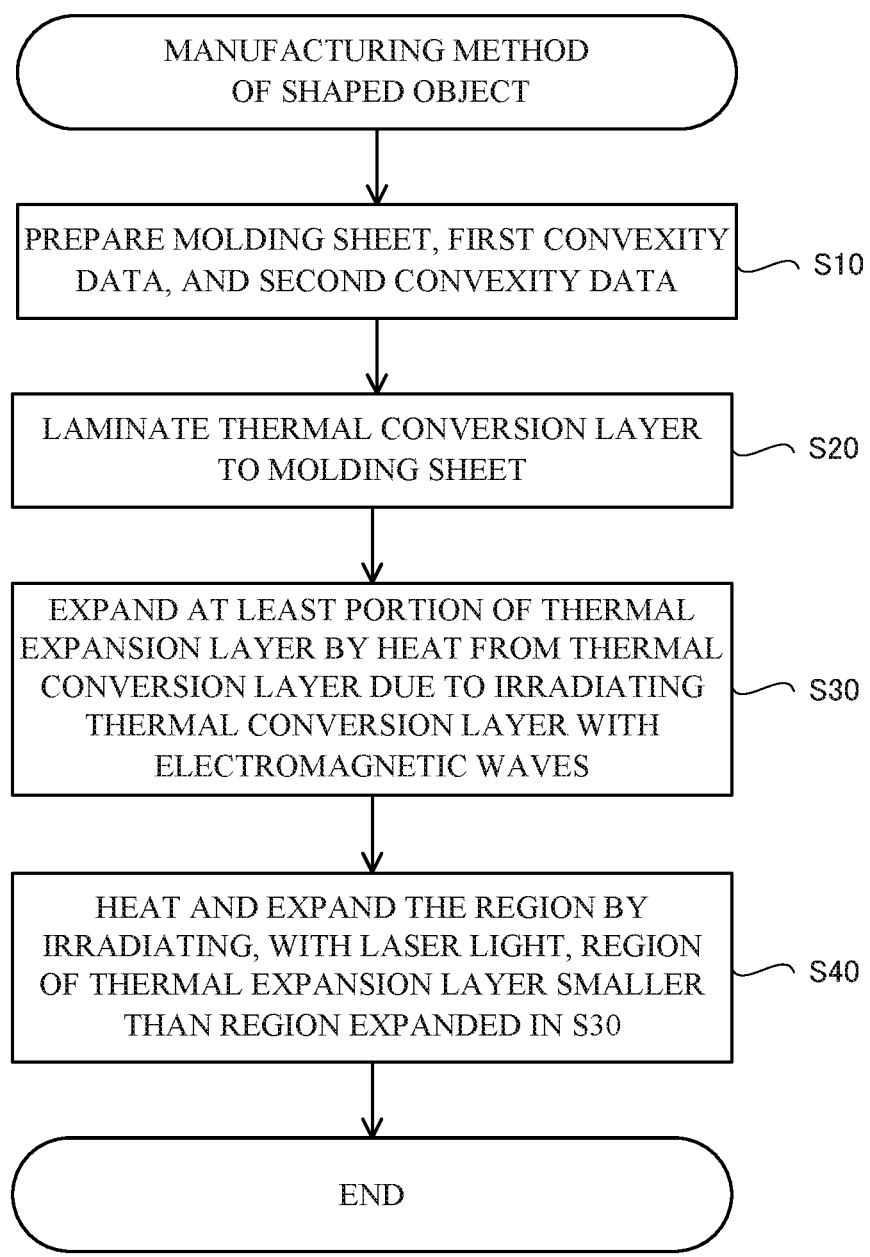
FIG. 8 is a flowchart illustrating a manufacturing method of a shaped object according to Embodiment 1 of the present disclosure.

FIG. 8 is a flowchart illustrating the manufacturing method of the shaped object 50. The manufacturing method of the shaped object 50 includes a preparation step of preparing the molding sheet 10 and the data (step S10), a thermal conversion layer laminating step of laminating to the molding sheet 10 the thermal conversion layer 80 for conversion of the electromagnetic waves into heat (step S20), a first expansion step of causing heating and expansion of at least a portion of the thermal expansion layer 20 of the molding sheet 10 by irradiation of the thermal conversion layer 80 with the electromagnetic waves to release of heat from the thermal conversion layer 80 (step S30), and a second expansion step of causing heating and expansion of a region with the laser light by irradiating the region of a size smaller than the region of the thermal expansion layer 20 expanded in the first expansion step that is step S30 (step S40).

The molding sheet 10, the first convexity data associating the position of the thermal expansion layer 20 with the height for causing expansion of the first convexity 62, and the second convexity data associating the position on the thermal expansion layer 20 and the height for causing expansion of the second convexity 72 are prepared in the preparation step (step S10).

The molding sheet 10 is manufactured by screen printing, for example, onto the first main surface 12a of the base 12 a coating liquid formed by mixing the binder and the thermal expansion material, and then drying the printed coating liquid.

Figure 9:
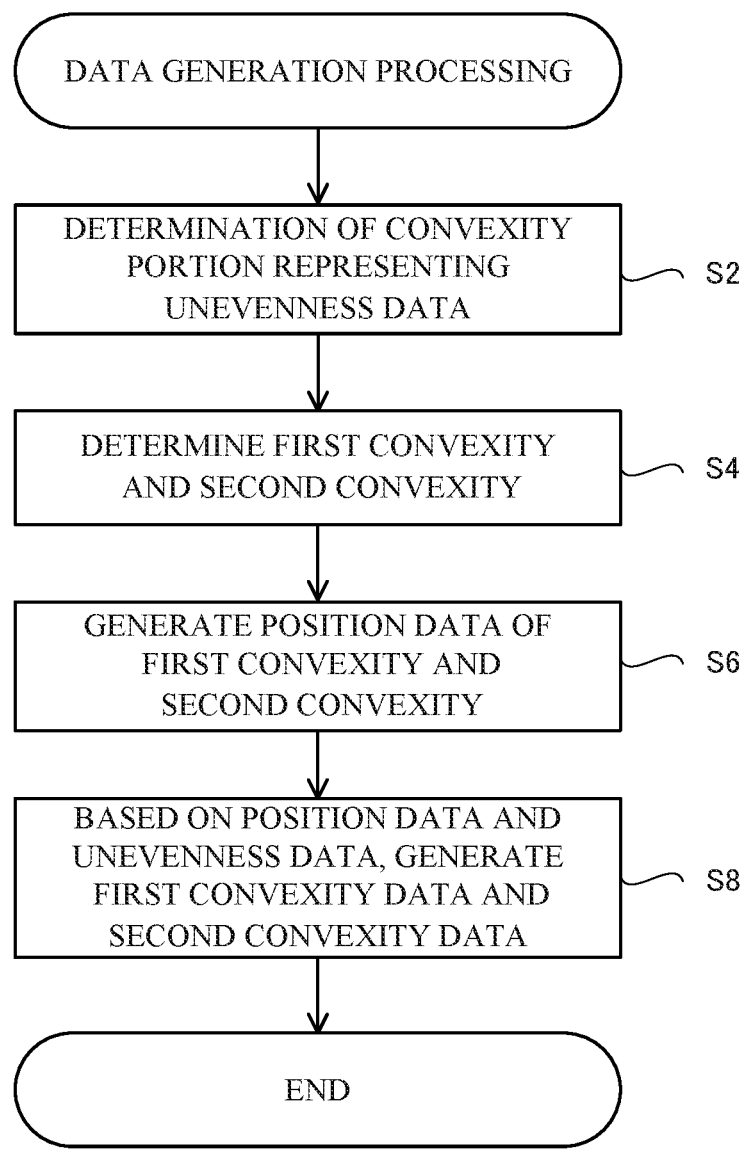
FIG. 9 is a flowchart illustrating data generation processing according to Embodiment 1 of the present disclosure.
Figure 10:
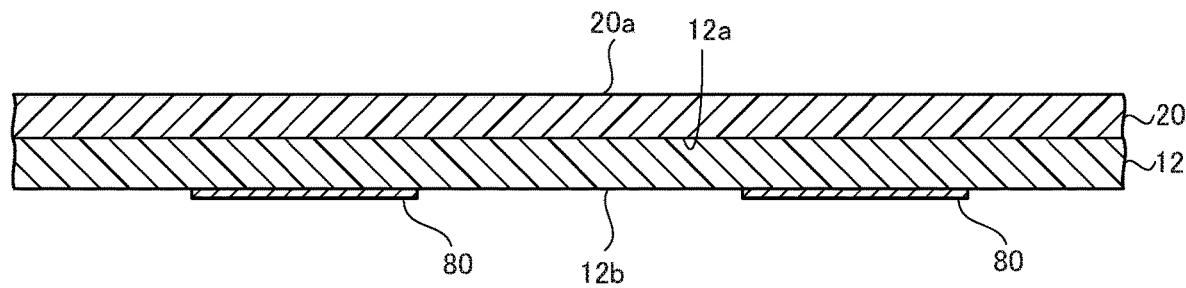
FIG. 10 is a schematic view illustrating a cross section of a molding sheet onto which is laminated a thermal conversion layer according to Embodiment 1 of the present disclosure.

As illustrated in FIG. 9, the first convexity data and the second convexity data are generated from the unevenness data by data generation processing executed by the control unit 100. The unevenness data represents the unevenness shape of the shaped object 50, and is data that associates the position on the thermal expansion layer 20 with the height for causing expansion. In the data generation processing, firstly the determiner 112 of the controller 110, by a command from the user, acquires the unevenness data stored in the storage 121, and determines the convexity portions represented by the unevenness data (step S2). Then the determiner 112 determines that the convexity portion for which the height, the width, and the length are each greater than or equal to the respective threshold is the first convexity 62, and determines that the convexity portion for which at least one of the width or the length is less than the respective threshold value is the second convexity 72 (step S4). The determiner 112 generates the position data representing the positions of the determined first convexity 62 and second convexity 72, and outputs such position data to the generator 114 of the controller 110 (step S6). Next, the generator 114 generates the first convexity data and the second convexity data based on the unevenness data and the position data output from the determiner 112 (step S8). The first convexity data and the second convexity data are prepared by such processing. Further, the unevenness data can be generated from computer-aided design (CAD) data of the shaped object 50.

Again with reference to FIG. 8, in the thermal conversion layer laminating step (step S20), based on the first convexity data, the printing device 200 prints a lightness-darkness pattern, that is, a pattern corresponding to the first unevenness 60, onto the second main surface 12b of the base 12 of the molding sheet 10 in accordance with height and position of the first convexity 62 using ink that includes the thermal conversion material. Due to this operation, as illustrated in FIG. 10, the thermal conversion layer 80 is laminated onto the second main surface 12b of the base 12 of the molding sheet 10.

Then in the first expansion step (step S30), while transporting the molding sheet 10 to which the thermal conversion layer 80 is laminated, the first expander 310 of the expansion apparatus 300 irradiates the thermal conversion layer 80 with the electromagnetic waves that the thermal conversion layer 80 converts into heat. Then due to the heat released from the thermal conversion layer 80, the portion of the thermal expansion layer 20 of the molding sheet 10 corresponding to the thermal conversion layer 80 is heated and expands. The first convexity 62 is formed by this operation.

Finally in a second expansion step (step S40), during transporting of the molding sheet 10 on which the first convexity 62 is formed, the second expander 320 of the expansion apparatus 300 irradiates with the laser light the thermal expansion layer 20 of the molding sheet 10 on which the first convexity 62 is formed. Specifically, on the basis of the second convexity data, the second expander 320 causes heating and expansion of the region C by irradiation with the laser light of the region C that is smaller in size that the size of the region B expanded in the first expansion step (step S30) of the thermal expansion layer 20. Due to such operation, the thermal expansion layer 20 expands, and the second convexity 72 is formed. The above processing enables manufacture of the shaped object 50.

In the present embodiment, the second expander 320 of the expansion apparatus 300 locally heats the small region C of the thermal expansion layer 20 of the molding sheet 10, thereby enabling the expansion apparatus 300 to manufacture the shaped object 50 that has the further finely-detailed second unevenness 70. Moreover, the first expander 310 of the expansion apparatus 300 heats the large region B of the thermal expansion layer 20 across an entire thickness direction of the thermal expansion layer 20 via the thermal conversion layer 80, and thus can form a large and tall first unevenness 60. Therefore, the expansion apparatus 300 can manufacture the shaped object 50 that has tall and fine unevennesses.

Embodiment 2

Although the second convexity 72 is formed in Embodiment 1 after formation of the first convexity 62, the first convexity 62 may be formed after the second convexity 72.

The molding sheet 10, the shaped object 50, the control unit 100, and the printing device 200 of the present embodiment are similar to those of Embodiment 1, and thus the shaping system 1 of the expansion apparatus 300 is described below.

Figure 11:
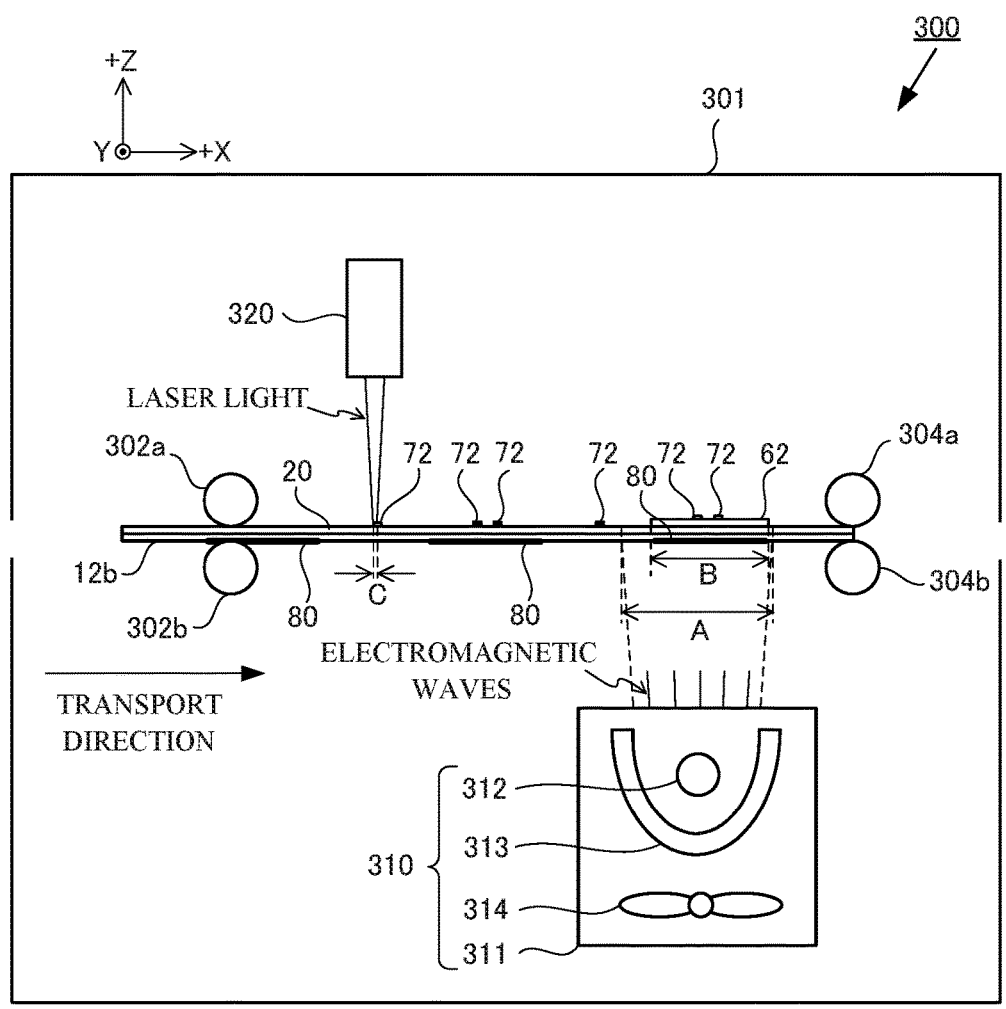
FIG. 11 is a schematic view illustrating an expansion apparatus according to Embodiment 2 of the present disclosure.

As illustrated in FIG. 11, the expansion apparatus 300 of the present embodiment includes, within the housing 301, the transport rollers 302a, 302b, 304a, and 304b, the first expander 310, and the second expander 320. Moreover, the expansion apparatus 300 includes a controller including a CPU and a storage including ROM and RAM, although these components are not illustrated. In the present embodiment, the disposal of the first expander 310 and the second expander 320 differs from the disposal of the first expander 310 and the second expander 320 in Embodiment 1. The other components are configured similarly to those of Embodiment 1.

In the same manner as the first expander 310 of Embodiment 1, the first expander 310 of the present embodiment irradiates with the electromagnetic waves the thermal conversion layer 80 laminated onto the molding sheet 10, thereby causing expansion of the portion corresponding to the thermal conversion layer 80 of the thermal expansion layer 20. The first expander 310 of the present embodiment is disposed further to the +X side than the second expander 320. Moreover, the first expander 310 of the present embodiment irradiates with the electromagnetic waves from the second main surface 12b side of the base 12. Similarly to the first expander 310 of Embodiment 1, the first expander 310 of the present embodiment includes the cover 311, the lamp 312, the reflection plate 313, and the fan 314. The cover 311, the lamp 312, the reflection plate 313, and the fan 314 are configured similarly to such components in Embodiment 1.

Similarly to the second expander 320 of Embodiment 1, the second expander 320 of the present embodiment causes heating and expansion of the region C by irradiating with the laser light the region C that is smaller in size than the region, that is, the region B, of the first convexity 62 of the thermal expansion layer 20, made to expand by the first expander 310. The second expander 320 of the present embodiment is disposed further to the −X side than the first expander 310. Therefore, in the present embodiment, the first expander 310 and the second expander 320 are disposed, along the direction of transport of the molding sheet 10 by the transport rollers 302a, 302b, 304a, and 304b in order as the second expander 320 and the first expander 310.

Moreover, the second expander 320 of the present embodiment irradiates with the laser light from the thermal expansion layer 20 side. Similarly to the second expander 320 of Embodiment 1, the second expander 320 of the present embodiment is a carbon dioxide gas laser irradiator.

Figure 12:
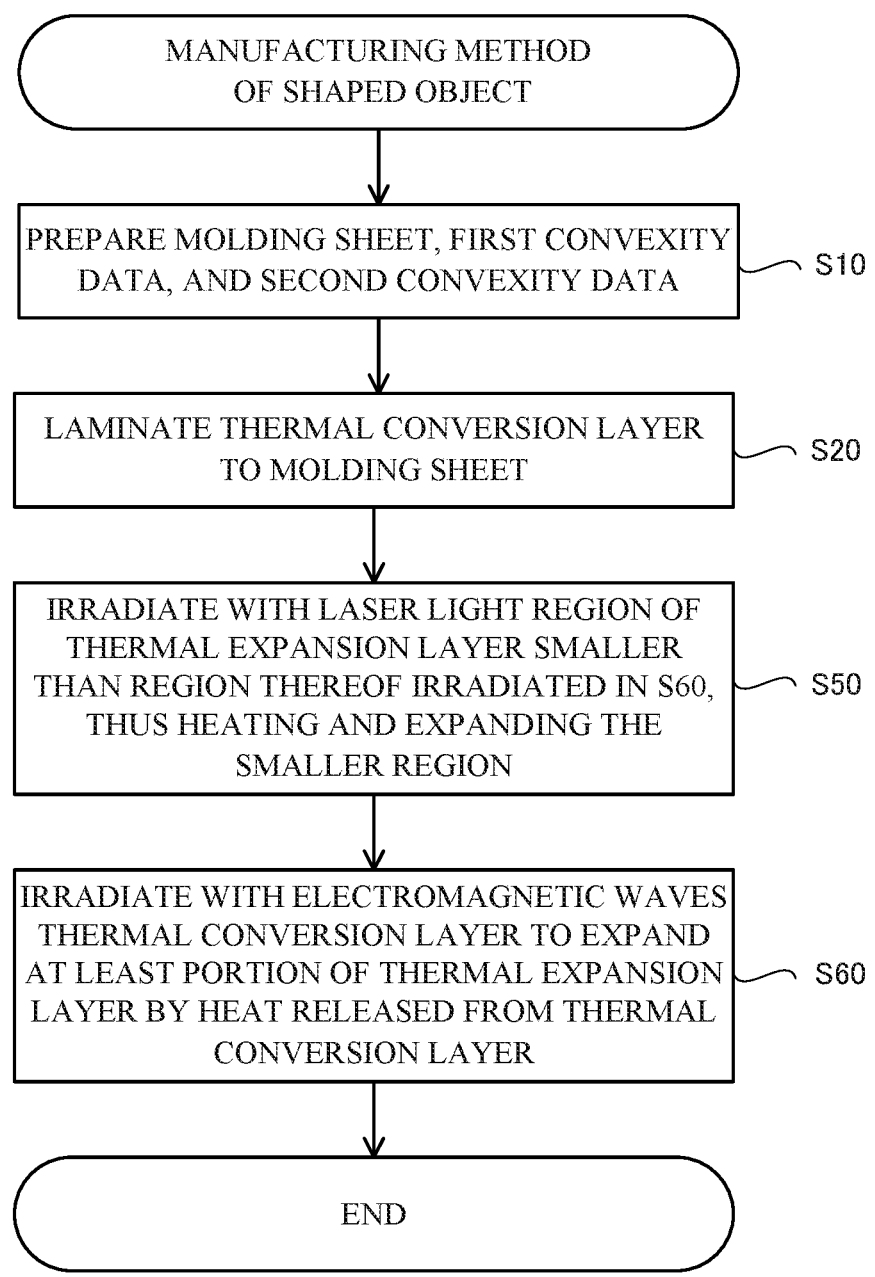
FIG. 12 is a flowchart illustrating a manufacturing method of a shaped object according to Embodiment 2 of the present disclosure.

The manufacturing method of the shaped object 50 of the present embodiment is described next. FIG. 12 is a flowchart illustrating the manufacturing method of the shaped object 50 of the present embodiment. The manufacturing method of the shaped object 50 of the present embodiment includes the preparation step (step S10), the thermal conversion layer laminating step (step S20), a second expansion step (step S50), and a first expansion step (step S60). The preparation step (step S10) and the thermal conversion layer laminating step (step S20) of the present embodiment are similar to the preparation step (step S10) and the thermal conversion layer laminating step (step S20) of Embodiment 1, and thus the second expansion step (step S50) and the first expansion step (step S60) are described below.

In the second expansion step (step S50), during transporting the molding sheet 10 to which the thermal conversion layer 80 is laminated, based on the second convexity data, the second expander 320 of the present embodiment irradiates with the laser light the region C that is smaller in size than the region B of the thermal expansion layer 20 expanded in the first expansion step (step S60). Thereafter, the region C is heated and expanded by the laser light. Due to such operation, the thermal expansion layer 20 expands, and the second convexity 72 is formed.

In the first expansion step (step S60), while the molding sheet 10 on which the second convexity 72 is formed is transported, the first expander 310 of the present embodiment irradiates with the electromagnetic waves the thermal conversion layer 80 laminated to the molding sheet 10 on which is formed the second convexity 72. Thereafter, the portion of the thermal expansion layer 20 corresponding to the thermal conversion layer 80 is expanded by the heat released from the thermal conversion layer 80. The first convexity 62 is formed by such operation. Due to the aforementioned operations, the shaped object 50 can be manufactured.

Due to localized heating of the small region C of the molding sheet 10 by the second expander 320 also in the present embodiment, the expansion apparatus 300 can manufacture the shaped object 50 that has the more finely-detailed second unevenness 70. Moreover, the first expander 310 heats the large region B of the molding sheet 10 along the entire thickness direction of the thermal expansion layer 20 via the thermal conversion layer 80, and thus can form a large and tall first unevenness 60. Therefore, the expansion apparatus 300 can manufacture the shaped object 50 that has the tall and fine unevenness.

Further, the second expander 320 locally heats the region C of the thermal expansion layer 20 with the laser light, and hardly heats the periphery of the region C. Therefore by formation of the first convexity 62 by the first expander 310 after formation of the second convexity 72 by the second expander 320, the first convexity 62 can be more accurately formed without undergoing the effects of heating in order to form the second convexity 72. In the present embodiment, the first expander 310 and the second expander 320 of the expansion apparatus 300 may be disposed in order as the second expander 320 and the first expander 310 along the transport direction of the molding sheet 10.

Embodiment 3

In Embodiment 1 and Embodiment 2, the first expander 310 and the second expander 320 are fixed to the housing 301, and the molding sheet 10 to which the thermal conversion layer 80 is laminated is transported. The first expander 310 and the second expander 320 may be moved without transporting the molding sheet 10 to which the thermal conversion layer 80 is laminated. Moreover, the molding sheet 10 to which the thermal conversion layer 80 is laminated may be irradiated from the same side with both the electromagnetic waves of the first expander 310 and the laser light of the second expander 320.

The molding sheet 10, the shaped object 50, the control unit 100, and the printing device 200 of the present embodiment are similar to such components of Embodiment 1, and thus the expansion apparatus 300 of the shaping system 1 is described below.

Figure 13:
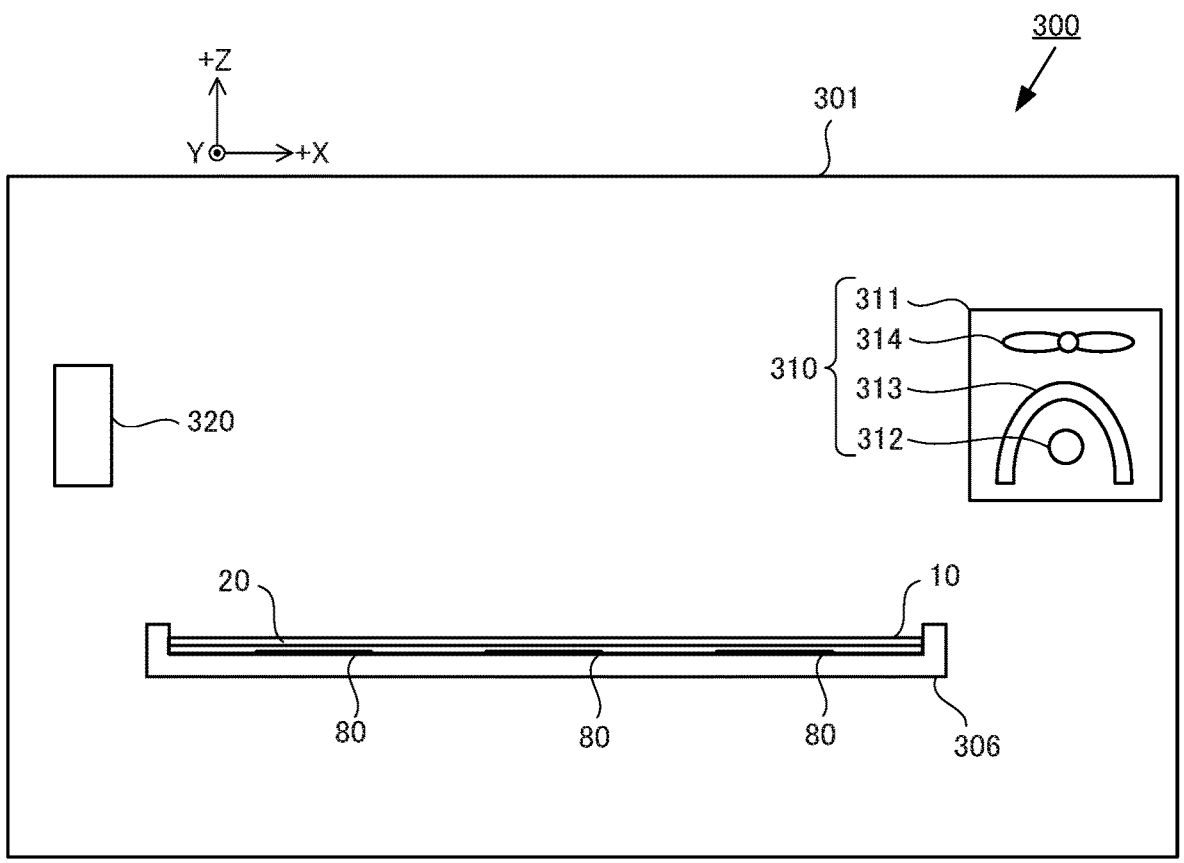
FIG. 13 is a schematic view illustrating an expansion apparatus according to Embodiment 3 of the present disclosure.

As illustrated in FIG. 13, the expansion apparatus 300 of the present embodiment includes, within the housing 301, a tray 306, the first expander 310, and the second expander 320. Moreover, the expansion apparatus 300 includes a controller including a CPU and a storage including ROM and RAM, although such components are not illustrated.

The tray 306 of the expansion apparatus 300 is used to dispose the molding sheet 10 carried thereon at a prescribed position in the expansion apparatus 300. The tray 306 is a box-shaped case that has an open surface in the +Z direction, for example. The molding sheet 10 to which the thermal conversion layer 80 is laminated is carried on the tray 306 such that the thermal expansion layer 20 faces the +Z-axis direction.

Figure 14:
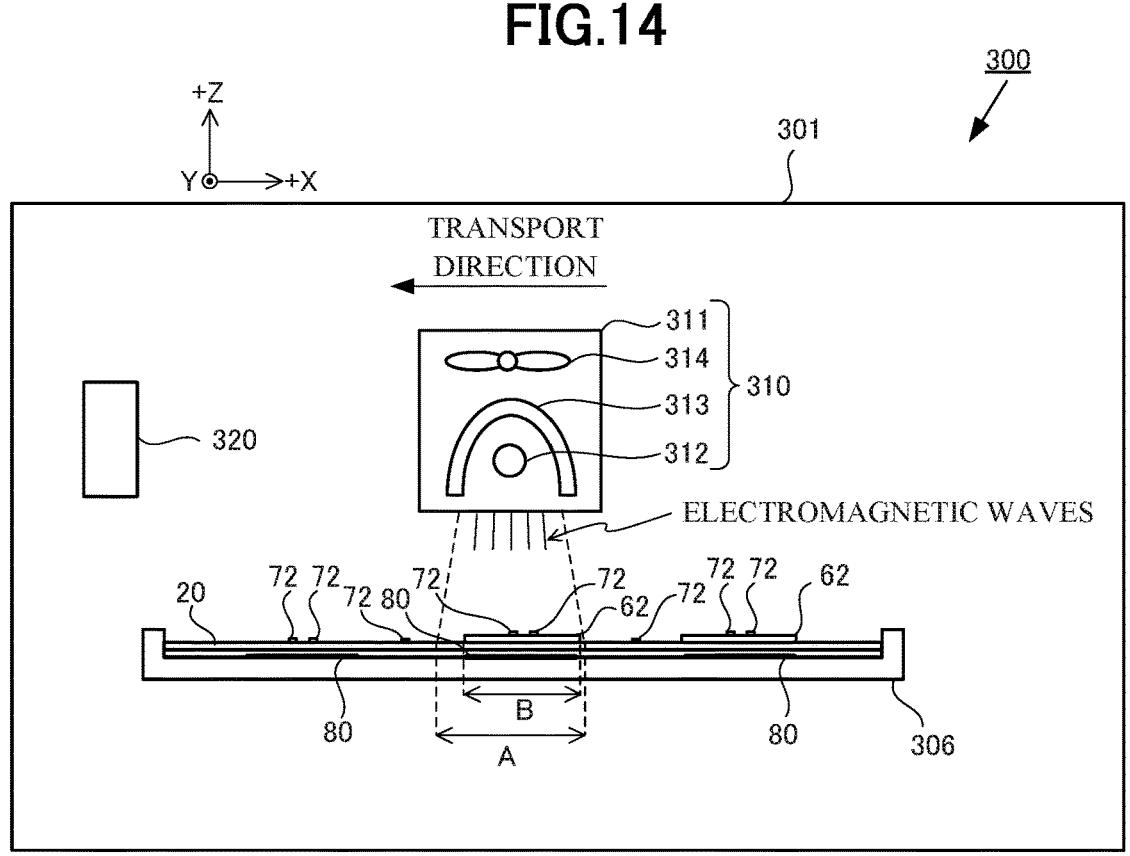
FIG. 14 is a schematic view illustrating an expansion apparatus according to Embodiment 3 of the present disclosure.

As illustrated in FIG. 14, while moving above the molding sheet 10 to which the thermal conversion layer 80 is laminated, the first expander 310 of the present embodiment irradiates with the electromagnetic waves the thermal conversion layer 80 laminated to the molding sheet 10. Due to such operation, the first expander 310 of the present embodiment causes the release of heat of the thermal conversion layer 80 within the region A irradiated with the electromagnetic waves, and causes heating and expansion of the portion of the thermal expansion layer 20 corresponding to the thermal conversion layer 80. Similarly to Embodiment 1, the thermal conversion layer 80 is formed based on the first convexity data, and thus the first convexity 62 is formed in the thermal expansion layer 20.

The first expander 310 in the present embodiment irradiates with the electromagnetic waves from the thermal expansion layer 20 side while moving in the −X-axis direction from the +X-side standby position. Moreover, similarly to Embodiment 1, the region A irradiated with the electromagnetic waves by the first expander 310 of the present embodiment is wider than the region C irradiated by the laser light of the second expander 320 of the present embodiment. Further, the term "standby position" refers to the position of withdrawal from above the molding sheet 10.

The first expander 310 of the present embodiment, similarly to Embodiment 1, includes the cover 311, the lamp 312, the reflection plate 313, and the fan 314. Moreover, the first expander 310 of the present embodiment is moved above the molding sheet 10 in the −X-axis direction and +X-axis direction by a non-illustrated movement mechanism. The configurations of the cover 311, the lamp 312, the reflection plate 313, and the fan 314 are similar to such configurations in Embodiment 1.

Figure 15:
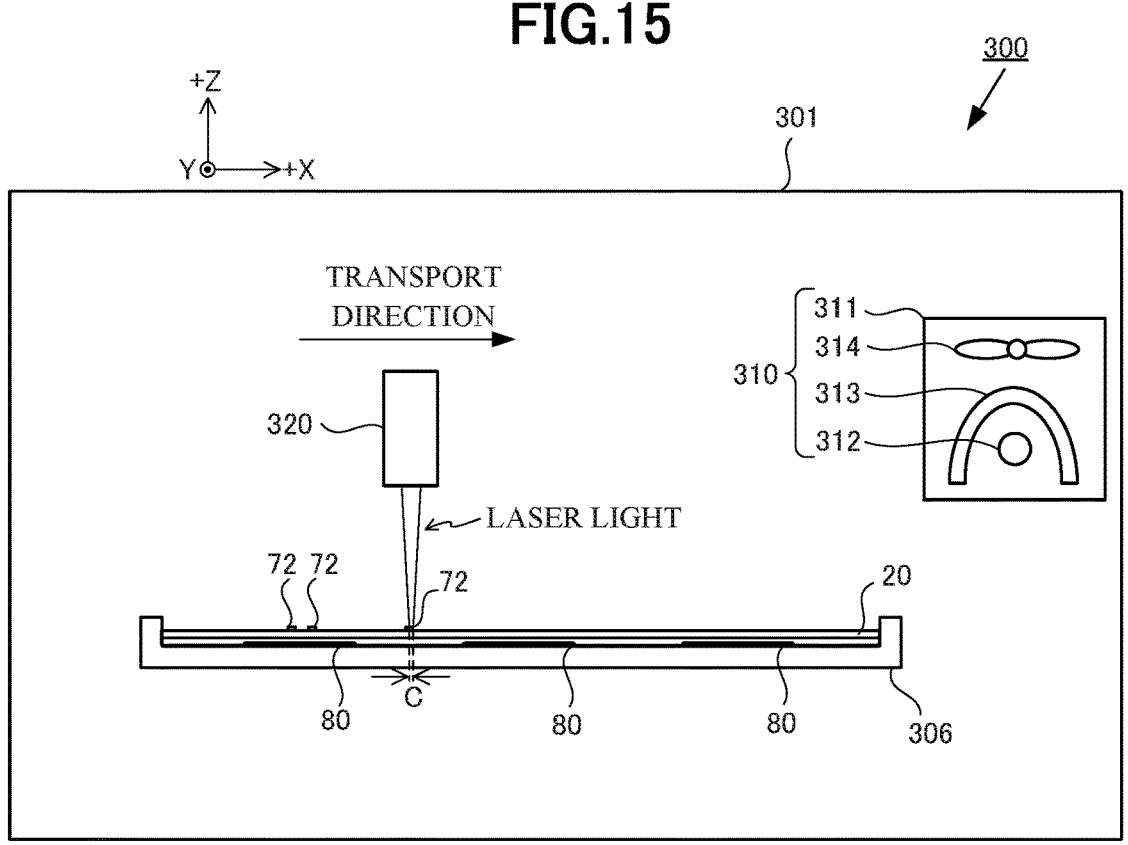
FIG. 15 is another schematic view illustrating an expansion apparatus according to Embodiment 3 of the present disclosure.

The second expander 320 of the present embodiment, based on the second convexity data, moves in the +X-axis direction and repeatedly irradiates, that is, scans, with the laser light. The second expander 320 causes heating and expansion of the region C by irradiating with the laser light the region C that is smaller is size than the region B expanded by the first expander 310 in the thermal expansion layer 20. Specifically, as illustrated in FIG. 15, the second expander 320 of the present embodiment moves above the molding sheet 10 to which the thermal conversion layer 80 is laminated, and based on the second convexity data, causes heating and expansion of the thermal expansion material by irradiation with the laser light. Due to such operation, the thermal expansion layer 20 expands, and the second convexity 72 is formed in the thermal expansion layer 20.

In the present embodiment, the second expander 320 moves from the standby position of the −X side to the +X-axis direction, and irradiation with the laser light is performed from the thermal expansion layer 20 side.

Similarly to Embodiment 1, the second expander 320 of the present embodiment is a carbon dioxide gas laser irradiator. The second expander 320 of the present embodiment moves above the molding sheet 10 in the +X-axis direction and the −X-axis direction due to a non-illustrated movement mechanism.

Figure 16:
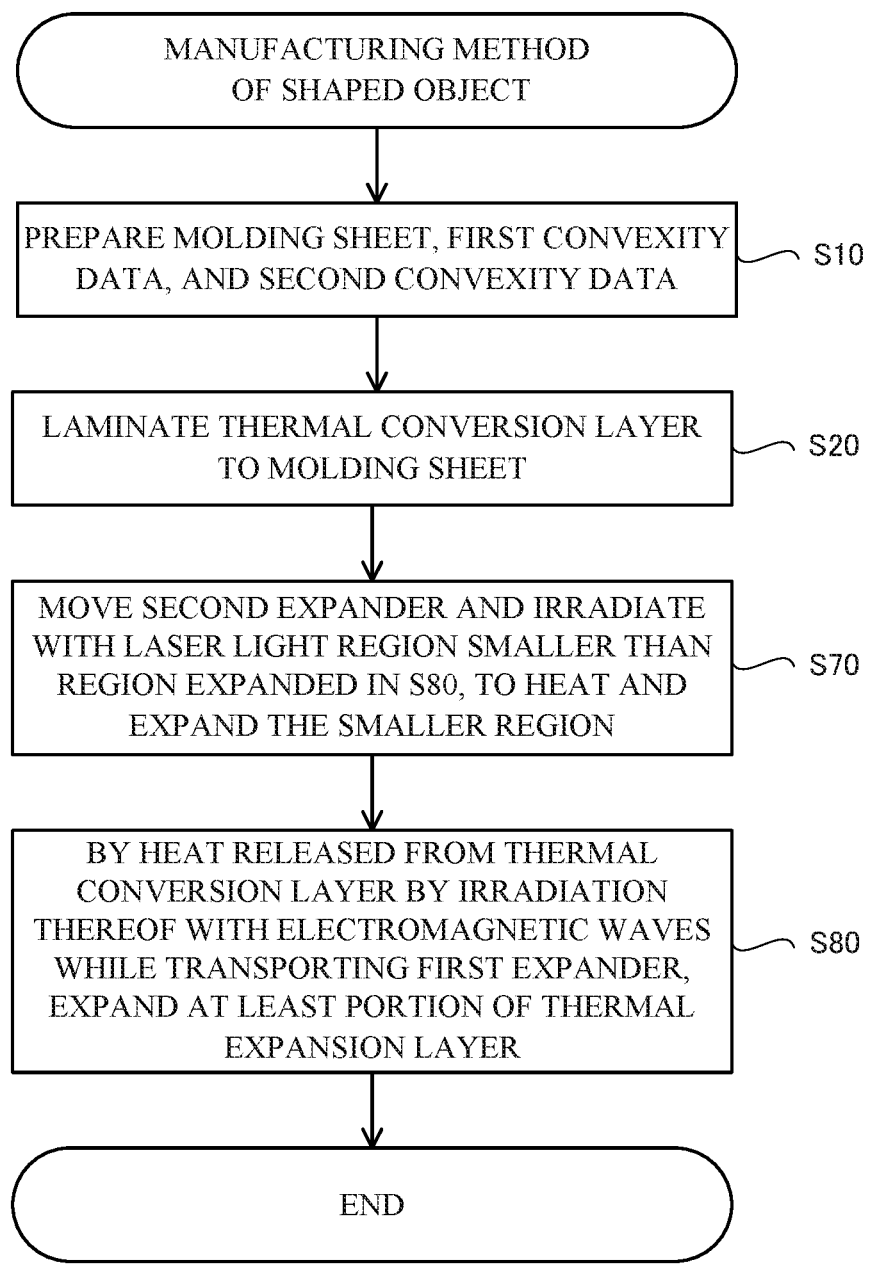
FIG. 16 is a flowchart illustrating a manufacturing method of a shaped object according to Embodiment 3 of the present disclosure.

Next, the manufacturing method of the shaped object 50 of the present embodiment is described. FIG. 16 is a flowchart illustrating the manufacturing method of the shaped object 50 of the present embodiment. The manufacturing method of the shaped object 50 of the present embodiment includes the preparation step (step S10), the thermal conversion layer laminating step (step S20), a second expansion step (step S70), and a first expansion step (step S80). The preparation step (step S10) and the thermal conversion layer laminating step (step S20) of the present embodiment are similar to the preparation step (step S10) and the thermal conversion layer laminating step (step S20) of Embodiment 1, and thus the second expansion step (step S70) and the first expansion step (step S80) are described.

As illustrated in FIG. 15, in the second expansion step (step S70), the second expander 320 is moved, and based on the second convexity data, the second expander 320 irradiates with the laser light the region C that is smaller in size than the region B expanded in the thermal expansion layer 20 in the first expansion step (step S80). Then the region C is heated and expanded with the laser light. The second convexity 72 is formed by repeatedly moving the second expander 320 and irradiating with the laser light by the second expander 320.

As illustrated in FIG. 14, in the first expansion step (step S80), while the first expander 310 is moved, the first expander 310 irradiates with the electromagnetic waves the thermal conversion layer 80 laminated onto the molding sheet 10 on which is formed the second convexity 72. Then the heat released from the thermal conversion layer 80 causes heating and expansion of the portion of the thermal expansion layer 20 corresponding to the thermal conversion layer 80. Due to such operation, the first convexity 62 is formed. The shaped object 50 can be manufactured by the aforementioned operations.

The second expander 320 locally heats the small region C also in the present embodiment, and thus the expansion apparatus 300 can manufacture the shaped object 50 that has a more finely detailed second unevenness 70. Moreover, similarly to Embodiment 1, the expansion apparatus 300 can manufacture the shaped object 50 that has a high and fine unevenness. Further, after formation of the second convexity 72 by the second expander 320, the first convexity 62 is further formed by the first expander 310. Therefore, similarly to Embodiment 3, the first convexity 62 can be formed accurately without undergoing the effects of heating due to the forming of the second convexity 72.

Embodiment 4

Although in Embodiment 1 to Embodiment 3 the first expander 310 irradiates with the electromagnetic waves the thermal conversion layer 80 laminated to the molding sheet 10, a means other than the first expander 310 may be used.

Molding Sheet and Shaped Object

Figure 17:
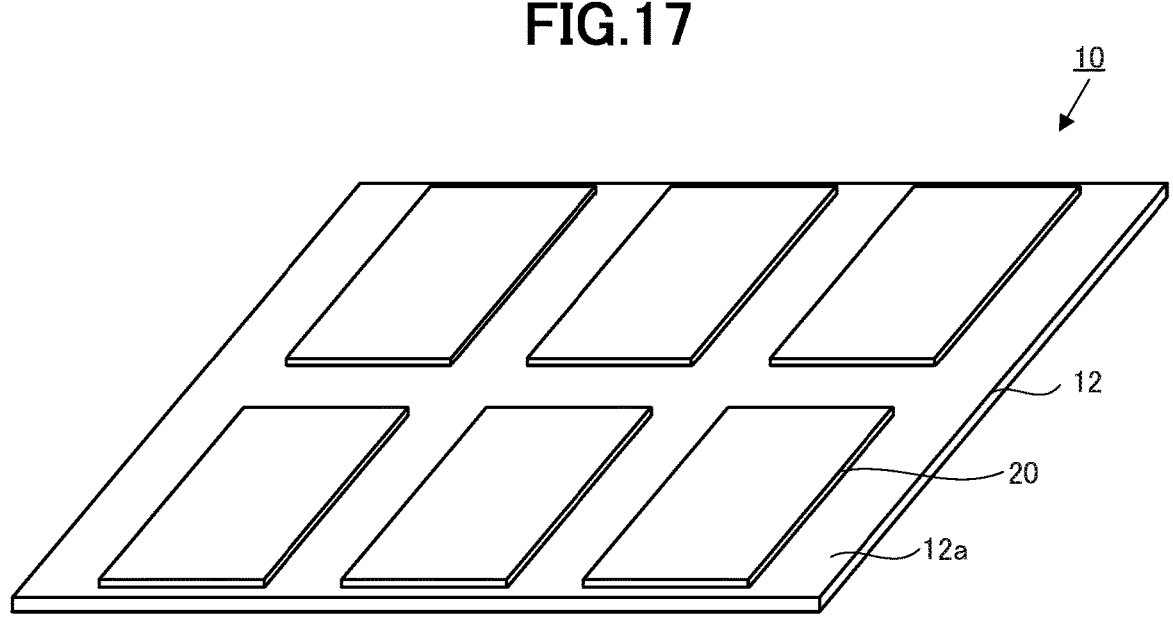
FIG. 17 is a perspective view illustrating a molding sheet according to Embodiment 4 of the present disclosure.

Firstly, the molding sheet 10 and the shaped object 50 of the present embodiment are described with reference to FIGS. 17 to 19. As illustrated in FIG. 17, the molding sheet 10 includes the base 12 and the thermal expansion layer 20. In the present embodiment, the thermal expansion layer 20 is laminated onto the first main surface 12a of the base 12 in a prescribed pattern that corresponds to the shape and disposal of the first convexity 62 of the below-described shaped object 50. Other configuration of the base 12 and the thermal expansion layer 20 is similar to that in Embodiment 1.

Figure 18:
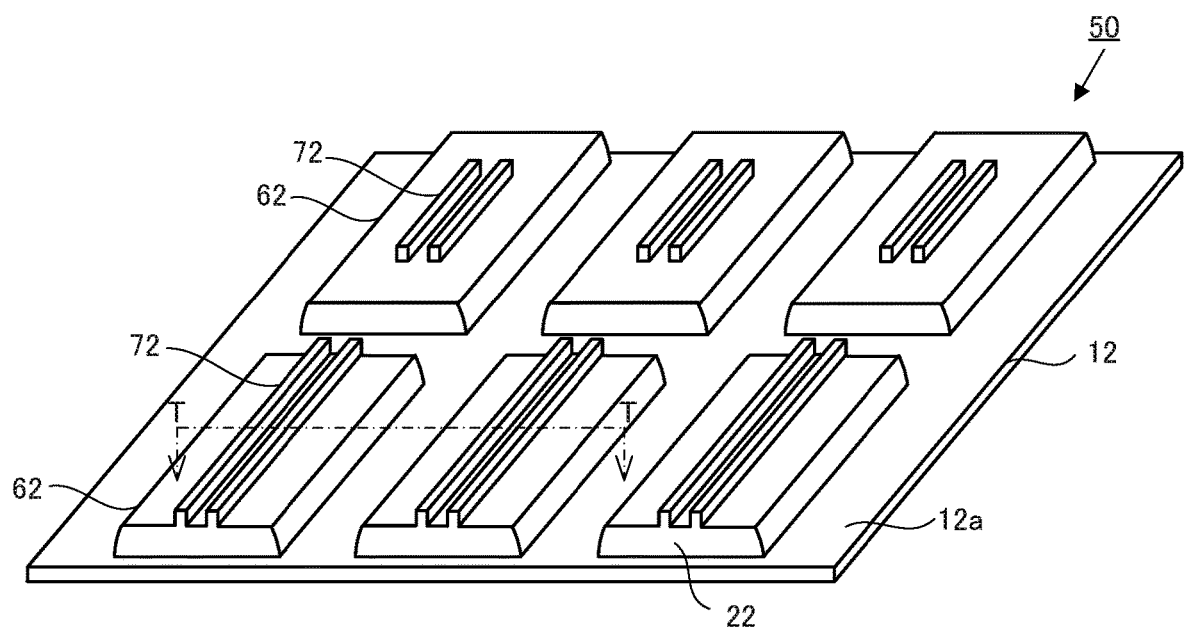
FIG. 18 is a perspective view illustrating a shaped object according to Embodiment 4 of the present disclosure.
Figure 19:
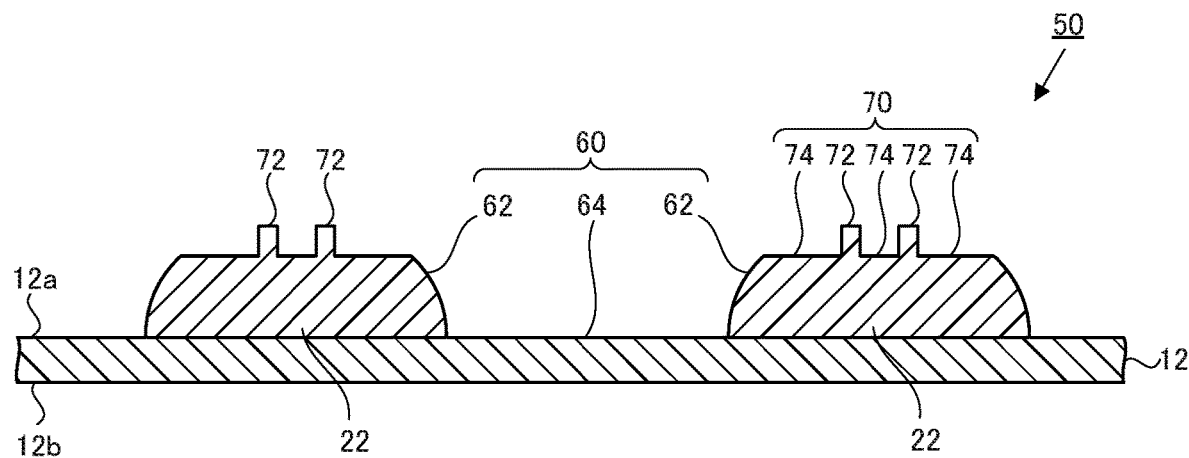
FIG. 19 is a cross-sectional view showing the shaped object illustrated in FIG. 18 taken at line T-T.

As illustrated in FIGS. 18 and 19, the shaped object 50 of the present embodiment includes the base 12, and the thermal expansion layers 22 including the first convexity 62 and the second convexity 72 laminated onto the first main surface 12a of the base 12. The shaped object 50 of the present embodiment has the first unevenness 60 formed from the first convexities 62 and the first concavities 64, and the second unevennesses 70 formed from the second convexities 72 and the second concavities 74. The first unevenness 60 is an unevenness due to the first convexities 62, and the second unevenness 70 is an unevenness due to the second convexities 72. The base 12 of the shaped object 50 of the present embodiment is configured similarly to the base 12 of Embodiment 1, and thus the thermal expansion layer 22 of the shaped object 50 is described here. In the present embodiment, the shaped object 50 does not include the thermal conversion layer 80.

The thermal expansion layer 22 of the shaped object 50 is the layer that is the expanded thermal expansion layer 20 of the molding sheet 10. The thermal expansion layer 22 includes the binder similarly to the binder of the thermal expansion layer 20 of the molding sheet 10, and the thermal expansion material that is the expanded material of the thermal expansion layer 20 of the molding sheet 10.

Moreover, the thermal expansion layer 22 includes the first convexity 62 and the second convexity 72. Similarly to the first convexity 62 of Embodiment 1, the first convexity 62 of the present embodiment has a width and a length that are each greater than or equal to the respective determined threshold. Moreover, similarly to the second convexity 72 of Embodiment 1, the second convexity 72 of the present embodiment has at least one of a width or a length that is smaller than the respective threshold. That is to say, when the first unevenness 60 and the second unevenness 70 are compared, the second unevenness 70 is finer than the first unevenness 60.

Shaping System

Figure 20:
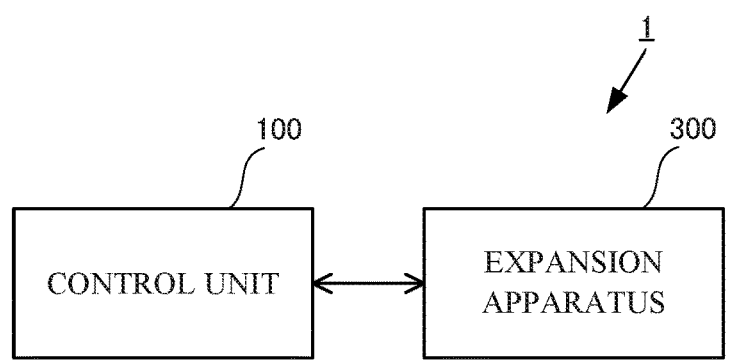
FIG. 20 illustrates configuration of a shaping system according to Embodiment 4 of the present disclosure.

The shaping system 1 of the present embodiment is described next. As illustrated in FIG. 20, the shaping system 1 of the present embodiment is provided with the control unit 100, and the expansion apparatus 300 for forming the first convexity 62 and the second convexity 72, that is, the first unevenness 60 and the second unevenness 70. The shaping system 1 of the present embodiment is not provided with the printing device 200.

The control unit 100 of the present embodiment controls the expansion apparatus 300. Similarly to Embodiment 1, the control unit 100 includes the controller 110, the storage 121, the communication unit 122, the recording medium drive 123, the operation unit 124, and the display 125. The storage 121, the communication unit 122, the recording medium drive 123, the operation unit 124, and the display 125 of the present embodiment are configured similarly to Embodiment 1.

The controller 110 of the present embodiment controls the various components of the control unit 100. Moreover, the controller 110 controls operation of the expansion apparatus 300. The controller 110 of the present embodiment operates similarly to the controller 110 of Embodiment 1, except for not controlling the printing device 200 and not generating the first convexity data and the second convexity data. In the present embodiment, the second convexity data associating the position on the thermal expansion layer 20 and the height for causing expansion as the second convexity 72 is created by the user and is stored beforehand in the storage 121.

Figure 21:
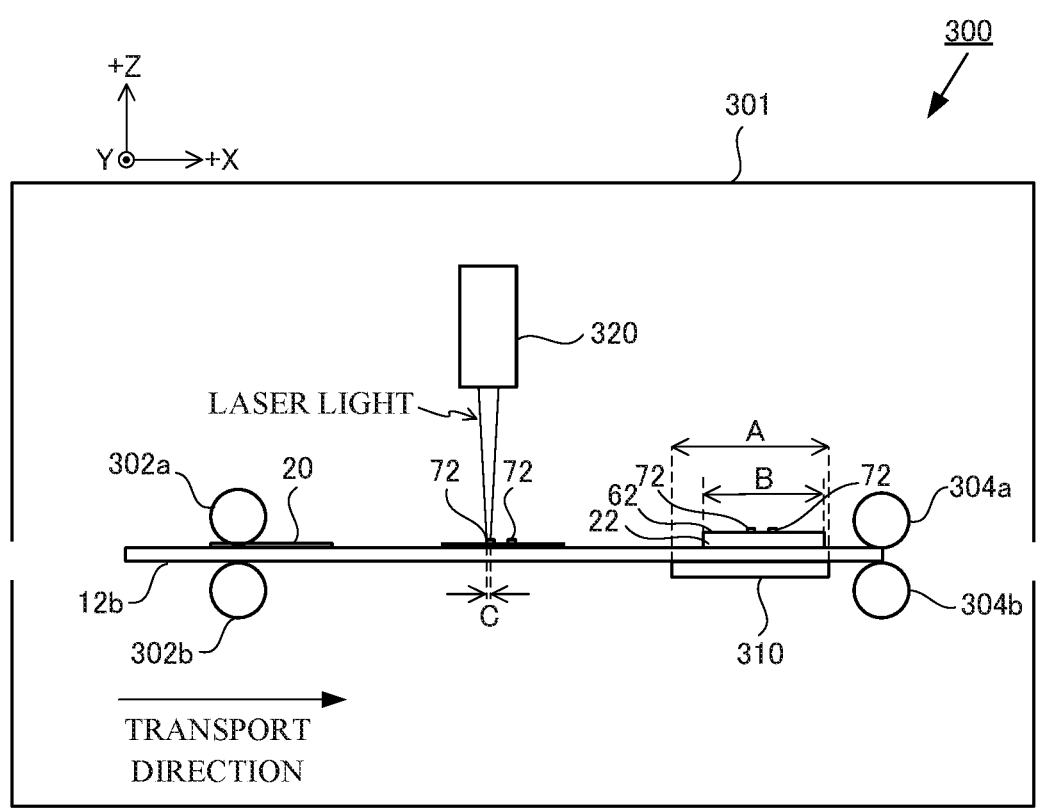
FIG. 21 is a schematic view illustrating an expansion apparatus according to Embodiment 4 of the present disclosure.

As illustrated in FIG. 21, the expansion apparatus 300 of the present embodiment includes, within the housing 301, the transport rollers 302a, 302b, 304a, and 304b, the first expander 310, and the second expander 320. Moreover, the expansion apparatus 300 is equipped with a controller including a CPU and a storage including ROM and RAM, none of which are illustrated.

Similarly to Embodiment 1, the transport rollers 302a, 302b, 304a, and 304b function as a transporter for transporting the molding sheet 10. In the present embodiment, the molding sheet 10 is guided by a non-illustrated transport guide and is transported from the −X side to the +X side with the thermal expansion layer 20 facing the +Z-axis direction.

The first expander 310 of the present embodiment heats the transported molding sheet 10 and thus causes expansion of at least a portion of the thermal expansion layer 20. The first expander 310 of the present embodiment, for example, is an electrical heater than heats the region A. In the present embodiment, the thermal expansion layer 20 of the molding sheet 10 is formed in a pattern corresponding to the shape and position of the first convexity 62. Therefore, by the first expander 310 of the present embodiment heating the molding sheet 10 that is being transported, the thermal expansion layer 20 of the molding sheet 10 is expanded, and the first convexity 62 is formed.

In the present embodiment, the first expander 310 is disposed at the −Z side of the transport path of the molding sheet 10 and heats the molding sheet 10 from the second main surface 12b side of the base 12. Moreover, the first expander 310 is disposed to the +X side of the second expander 320. In the present embodiment, the region A heated by the first expander 310 is wider than the region C irradiated with the laser light by the second expander 320.

Similarly to the second expander 320 of Embodiment 1, the second expander 320 of the present embodiment irradiates with the laser light the region C that is smaller in size than the region, that is, the region B of the first convexity 62, of the thermal expansion layer 20 expanded by the first expander 310. The second expander 320 of the present embodiment causes heating and expansion of the region C by use of the laser light. Specifically, the second expander 320 of the present embodiment, on the basis of the second convexity data stored in the storage 121 of the control unit 100, irradiates the position of the thermal expansion layer 20 for formation of the second convexity 72 with the laser light having a strength in accordance with the height of the second convexity 72. Then the second expander 320 of the present embodiment heats and expands the thermal expansion material with the laser light. Due to such operation, the thermal expansion layer 20 is expanded, and the second convexity 72 is formed.

The second expander 320 of the present embodiment is disposed to the −X side of the first expander 310, and irradiates with the laser light from the thermal expansion layer 20 side. Similarly to Embodiment 1, the second expander 320 of the present embodiment is a carbon dioxide gas laser irradiator.

Manufacturing Method of Shaped Object

Next, the manufacturing method of the shaped object 50 of the present invention is explained below. In the present embodiment, the shaped object 50 is manufactured from the molding sheet 10 that is sheet-like, such as an A4 paper-sized sheet.

FIG. 22 is a flowchart illustrating the manufacturing method of the shaped object 50 of the present embodiment. The manufacturing method of the shaped object 50 of the present embodiment includes: the preparation step of preparation of the molding sheet 10 and the data (step S10); a second expansion step of heating and expanding a region, smaller in size than the region expanded in the first expansion step (step S100), with laser light (step S90); and a first expansion step of heating the molding sheet 10 and expanding at least a portion of the thermal expansion layer 20 (step S100). The present embodiment does not include the thermal conversion layer laminating step (step S20).

In the preparation step (step S10), the molding sheet 10 and the second convexity data associating the position on the thermal expansion layer 20 with the height for causing expansion of the second convexity 72 are prepared. The molding sheet 10, for example, is manufactured by screen printing, onto the first main surface 12a of the base 12 in a pattern in accordance with the position and shape of the first convexity 62 of the shaped object 50, the coating liquid formed by mixing the binder and the thermal expansion material, and then drying the printed coating liquid. The second convexity data is created by the user.

Similarly to the second expansion step (step S30) of Embodiment 1, in the second expansion step (step S90), the position of formation of the second convexity 72 of the thermal expansion layer 20 is irradiated by the second expander 320 with the laser light of an intensity in accordance with the height of the second convexity 72 based on the second convexity data. Then the thermal expansion material is heated and expanded with the laser light. Due to such operation, the second convexity 72 is formed in the thermal expansion layer 20.

While the molding sheet 10 is transported in the first expansion step (step S100), the first expander 310 of the expansion apparatus 300 heats the molding sheet 10 and thus expands the thermal expansion layer 20. The first convexity 62 is formed due to such operation. Due to the aforementioned operations, the shaped object 50 can be manufactured.

In the present embodiment, the thermal expansion layer 20 is laminated in the prescribed pattern to the first main surface 12a of the base 12, and therefore the shaped object 50 can be manufacture without lamination of the thermal conversion layer 80 to the base 12. Moreover, the second expander 320 in the present embodiment also locally heats the region C that is small, and thus expansion apparatus 300 can manufacture the shaped object 50 that has the second unevenness 70 that is further detailed. Due to heating of the large region B of the molding sheet 10 over the entire thickness direction of the thermal expansion layer 20, the first expander 310 can form the first unevenness 60 that is large and high. Therefore, the expansion apparatus 300 is capable of manufacturing the shaped object 50 that has the unevenness that is high and finely detailed. Furthermore, after the second expander 320 forms the second convexity 72, the first expander 310 forms the first convexity 62. Therefore, similarly to Embodiment 3, the first convexity 62 can be formed accurately without undergoing the effects of heating for formation of the second convexity 72.

Modified Examples

Although embodiments of the present disclosure are described above, various types of modifications are possible within a scope that does not depart from the gist of the present disclosure.

For example, the shaped object 50 may be manufactured in a roll shape from a roll-like molding sheet 10.

The material included in the base 12 is not limited to thermoplastic resins. The material included in the base 12 may be paper, fabric, or the like. The thermoplastic resin included in the base 12 is not limited to polyolefin resins and polyester resins. The thermoplastic resin included in the base 12 may be a polyamide resin, a polyvinyl chloride (PVC) resin, a polyimide resin, or the like.

In Embodiment 1 to Embodiment 3, the thermal conversion layer 80 is laminated onto the second main surface 12b of the base 12. The thermal conversion layer 80 may be laminated onto the thermal expansion layer 20. Moreover, the thermal conversion layer 80 may be laminated to a release layer provided on the second main surface 12b of the base 12. Due to such configuration, by peeling away the release layer from the shaped object 50, the thermal conversion layer 80 can be removed from the shaped object 50.

The molding sheet 10 and the shaped object 50 may be formed with another layer of a freely-selected material between the various layers. For example, an adhesive layer may be formed between the base 12 and the thermal expansion layer 20 for causing stronger adhesion between the base 12 and the thermal expansion layer 20. The adhesive layer, for example, includes a surface modifier.

Moreover, a color image may be printed onto the shaped object 50. For example, a color ink layer representing the color image and including the four colors of cyan, magenta, yellow, and black may be laminated onto the thermal expansion layer 20 of the shaped object 50.

The printing device 200 is not limited to an ink jet printer. For example, the printing device 200 may be a laser printer. Moreover, the printing device 200 may print the color image onto the shaped object 50.

The direction in which the first expander 310 of Embodiment 1 to Embodiment 3 irradiates with the electromagnetic waves is freely-selected. For example, although the first expander 310 of Embodiment 1 and Embodiment 2 irradiates with the electromagnetic waves from the second main surface 12b side of the base 12, the first expander 310 of Embodiment 1 and Embodiment 2 may irradiate with the electromagnetic waves from the thermal expansion layer 20 side. Moreover, in Embodiment 3, the first expander 310 may irradiate with the electromagnetic waves from the second main surface 12b side of the base 12 when irradiating the molding sheet 10 placed in the tray 306 with the thermal conversion layer 80 facing in the +Z-axis direction. In this case, the tray 306 may have a opening part at the bottom in order not to impede expansion of the thermal expansion layer 20.

The direction in which the second expander 320 irradiates the molding sheet 10 with the laser light is freely-selected. In order to avoid absorption of the laser light by the thermal conversion layer 80, the second expander 320 may irradiate the thermal expansion layer 20 with the laser light from the side opposite to the side to which the thermal conversion layer 80 is laminated.

Furthermore, although in Embodiment 3 and Embodiment 4 the first convexity 62 is formed after formation of the second convexity 72, the second convexity 72 may be formed after the first convexity 62.

In Embodiment 1 to Embodiment 3, the region A in the thermal conversion layer 80 irradiated with the electromagnetic waves by the first expander 310 is wider than the region C in the thermal expansion layer 20 irradiated with the laser light by the second expander 320. Therefore an irradiation width of the laser light of the second expander 320 irradiated onto thermal expansion layer 20 is indicated as narrower than an irradiation width of the electromagnetic waves of the first expander 310 irradiated onto the thermal conversion layer 80.

In Embodiment 1 to Embodiment 4, the control unit 100 is equipped with the CPU 131, and the printing device 200 and the expansion apparatus 300 are controlled by functions of the CPU 131. In the present disclosure, the control unit 100 may be provided with dedicated hardware such as an application specific integrated circuit (ASIC), a field-programmable gate array (FPGA), a control circuit, or the like in place of the CPU 131. In this case, the individual processes may be executed by separate hardware. Alternatively, each of the processes may be executed collectively by a single hardware unit. Part of the processing may be executed by dedicated hardware, and the remaining other part of the processing may be executed by software or firmware. Moreover, the functions of the controller 110 of the control unit 100 may be executed by the controller of the expansion apparatus 300.

Furthermore, by providing a configuration for achieving the functions according to the present disclosure to a previously provided expansion apparatus, all of the functional configuration of the expansion apparatus 300 cited in the aforementioned embodiments can be achieved by control of the expansion apparatus by use of a program. That is, a program for achieving all of the functional configuration of the expansion apparatus 300 cited in the aforementioned embodiments can be used for enabling execution by a processor such as a CPU that controls a device such as a preexisting information processing device.

Moreover, the method of using such a program is freely-selected. The program may be used by storage on a computer-readable recording medium such as a flexible disc, a CD-ROM, a DVD-ROM, a memory card, or the like. Further, the program may be used via a communication medium such as the Internet by superposition on a carrier wave. For example, the program may be posted on, and distributed from, a bulletin board system (BBS) on the communication network. Moreover, a configuration may be used that executes the aforementioned processing by starting the program, and under control of the operating system (OS), executing the program similarly to execution of other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An expansion apparatus for processing a molding sheet comprising a base and a thermal expansion layer laminated onto a first main surface of the base, the molding sheet having a thermal conversion layer laminated on a second main surface of the base, the thermal conversion layer being configured to convert electromagnetic waves to heat, wherein the expansion apparatus comprises:
    a first light source comprising a lamp;
    a second light source comprising a laser; and
    a controller configured to:
        control the lamp of the first light source to irradiate the thermal conversion layer such that the thermal conversion layer converts electromagnetic waves from the first light source to heat to cause expansion of a first portion of the thermal expansion layer; and
        control the laser of the second light source to irradiate a second portion of the thermal expansion layer overlapping a part of the thermal conversion layer such that the second light source directly heats the second portion of the thermal expansion layer to cause expansion of the second portion of the thermal expansion layer,
    wherein the controller is configured to perform the control of the laser before the control of the lamp.

2. The expansion apparatus according to claim 1,
    wherein an irradiation width of the electromagnetic waves of the laser of the second light source with which the thermal conversion layer is irradiated with the thermal expansion layer is irradiated is less than an irradiation width of the electromagnetic waves of the lamp of the first light source with which the thermal conversion layer is irradiated.

3. The expansion apparatus according to claim 1, comprising:
a transporter configured to transport the molding sheet,
wherein the lamp of the first light source and the laser of the second light source are disposed, in order, as the laser and the lamp along a direction of transport of the molding sheet transported by the transporter.

4. The expansion apparatus according to claim 1, wherein the laser of the second light source is arranged to irradiate the second portion and overlapping the part of the first portion of the thermal conversion layer from a side of the first main surface of the base opposite to a side of the second main surface on which the thermal conversion layer is laminated.

5. The expansion apparatus according to claim 1,
wherein the lamp of the first light source has an irradiation region with a first area,
wherein the laser of the second light source has an irradiation region with a second area smaller than the first area,
wherein the second portion of the thermal expansion layer is within the second area of the irradiation region of the laser and overlaps a part of a first portion of the thermal conversion layer, the first portion of the thermal conversion layer having a third area equal to or smaller than the first area of the irradiation region of the lamp, and
wherein the controller is configured to:
control the lamp of the first light source to irradiate the first portion of the thermal conversion layer with the electromagnetic waves from the first light source to cause expansion of the first portion of the thermal expansion layer by heat generated through conversion by the first portion of the thermal conversion layer; and
control the laser of the second light source to irradiate the second portion of the thermal expansion layer with electromagnetic waves from the second light source to cause expansion of the second portion of the thermal expansion layer by directly heating the second portion of the thermal expansion layer.

6. The expansion apparatus according to claim 1,
wherein the first portion of the thermal conversion layer is less than an entirety of the thermal expansion layer.

7. A shaping system comprising:
the expansion apparatus according to claim 1; and
a printing device configured to print the thermal conversion layer onto the molding sheet.

8. A shaping system comprising:
the expansion apparatus according to claim 3; and
a printing device configured to print the thermal conversion layer onto the molding sheet.

9. A shaping system comprising
the expansion apparatus according to claim 4; and
a printing device configured to print the thermal conversion layer onto the molding sheet.

10. A shaping system for manufacturing a shaped object having unevenness from a molding sheet comprising a base and a thermal expansion layer laminated onto a first main surface of the base, the shaping system comprising:
a first light source comprising a lamp;
a second light source comprising a laser;
a printing device; and
a controller configured to:
receive unevenness data representing unevenness;
determine, based on the unevenness data representing unevenness, that a convexity having a width and a length that are each greater than or equal to a respective threshold is a first convexity, and that a convexity having at least one of a width or a length that is smaller than the respective threshold is a second convexity;
generate, based on (i) positions of the first convexity and the second convexity determined and (ii) the unevenness data, first convexity data representing the first convexity and second convexity data representing the second convexity;
control the printing device to print, based on the first convexity data generated, a thermal conversion layer onto the molding sheet to be laminated on a second main surface of the base, the thermal conversion layer being configured to convert electromagnetic waves to heat;
control the lamp of the first light source to irradiate the thermal conversion layer such that the thermal conversion layer converts electromagnetic waves from the first light source to heat to cause expansion of a first portion of the thermal expansion layer; and
control the laser of the second light source to irradiate a second portion of the thermal expansion layer overlapping a part of the thermal conversion layer such that the second light source directly heats the second portion of the thermal expansion layer to cause expansion of the second portion of the thermal expansion layer,
wherein the controller is configured to perform the control of the laser before the control of the lamp.

11. The shaping system according to claim 10,
wherein the lamp of the first light source has an irradiation region with a first area,
wherein the laser of the second light source has an irradiation region with a second area smaller than the first area,
wherein the second portion of the thermal expansion layer is within the second area of the irradiation region of the laser and overlaps a part of a first portion of the thermal conversion layer, the first portion of the thermal conversion layer having a third area equal to or smaller than the first area of the irradiation region of the lamp, and
wherein the controller is configured to:
control the lamp of the first light source to irradiate the first portion of the thermal conversion layer with the electromagnetic waves from the first light source to cause expansion of the first portion of the thermal expansion layer by heat generated through conversion by the first portion of the thermal conversion layer; and
control the laser of the second light source to irradiate the second portion of the thermal expansion layer with electromagnetic waves from the second light source to cause expansion of the second portion of the thermal expansion layer by directly heating the second portion of the thermal expansion layer.

12. The shaping system according to claim 10,
wherein the first portion of the thermal conversion layer is less than an entirety of the thermal expansion layer.

* * * * *